United States Patent
Kaneko et al.

(10) Patent No.: US 12,297,146 B2
(45) Date of Patent: May 13, 2025

(54) NEAR-INFRARED ABSORBING GLASS AND NEAR-INFRARED CUTOFF FILTER

(71) Applicant: HOYA CORPORATION, Tokyo (JP)

(72) Inventors: Masashi Kaneko, Tokyo (JP); Yuki Shiota, Tokyo (JP)

(73) Assignee: HOYA CORPORATION, Tokyo (JP)

( * ) Notice: Subject to any disclaimer, the term of this patent is extended or adjusted under 35 U.S.C. 154(b) by 133 days.

(21) Appl. No.: 17/788,459

(22) PCT Filed: Dec. 25, 2020

(86) PCT No.: PCT/JP2020/048961
§ 371 (c)(1),
(2) Date: Jun. 23, 2022

(87) PCT Pub. No.: WO2021/132645
PCT Pub. Date: Jul. 1, 2021

(65) Prior Publication Data
US 2023/0057228 A1 Feb. 23, 2023

(30) Foreign Application Priority Data

Dec. 27, 2019 (JP) .................................. 2019-239885

(51) Int. Cl.
*C03C 4/08* (2006.01)
*C03C 3/17* (2006.01)
(Continued)

(52) U.S. Cl.
CPC ............... *C03C 4/082* (2013.01); *C03C 3/17* (2013.01); *C03C 3/247* (2013.01); *G02B 5/208* (2013.01); *C03C 2204/00* (2013.01)

(58) Field of Classification Search
CPC ............ C03C 4/082; C03C 3/17; C03C 3/247
(Continued)

(56) References Cited

U.S. PATENT DOCUMENTS 6,225,244 B1 * 5/2001 Oguma .................. C03C 3/17
501/48
2012/0241697 A1 9/2012 Ohkawa et al.
(Continued)

FOREIGN PATENT DOCUMENTS

JP 2011168455 A * 9/2011
JP 2013-053058 A 3/2013
(Continued)

OTHER PUBLICATIONS

Machine_English_translation_KR_2017003375_A; Hashitani et. al.; Near Infrared Ray Absorbing glass and Filter; Jan. 9, 2017; EPO; whole document (Year: 2024).*
(Continued)

*Primary Examiner* — Tahseen Khan
(74) *Attorney, Agent, or Firm* — GREENBLUM & BERNSTEIN, P.L.C.

(57) ABSTRACT

The near-infrared absorbing glass contains at least, as constituent ions, P ions; Cu ions; O ions; one or more ions selected from the group consisting of Li ions, Na ions and K ions; and one or more ions selected from the group consisting of Mg ions, Ca ions, Sr ions and Ba ions, wherein, in a glass composition expressed in cation %, the content of Cu ions is 15.0 cation % or lower; the content of P ions is 55.0 cation % or lower; and a cation ratio of the total content of Al ions and P ions relative to the total content of Mg ions, Ca ions, Sr ions, Ba ions, Zn ions and Cu ions ((Al ions+P ions)/(Mg ions+Ca ions+Sr ions+Ba ions+Zn ions+Cu ions)) is 5.300 or lower.

13 Claims, 1 Drawing Sheet

(51) Int. Cl.
*C03C 3/247* (2006.01)
*G02B 5/20* (2006.01)

(58) Field of Classification Search
USPC ........................................................ 428/220
See application file for complete search history.

(56) References Cited

U.S. PATENT DOCUMENTS

| | | |
|---|---|---|
| 2013/0135714 A1 | 5/2013 | Kondo et al. |
| 2013/0207057 A1 | 8/2013 | Ikenishi et al. |

FOREIGN PATENT DOCUMENTS

| | | | | |
|---|---|---|---|---|
| JP | 2014-125395 A | | 7/2014 | |
| JP | 2019-038719 A | | 3/2019 | |
| KR | 10-2011-0102658 A | | 9/2011 | |
| KR | 2017-0003375 A | | 1/2017 | |
| KR | 2017003375 A | * | 1/2017 | ............. C03C 3/125 |
| TW | 201912600 A | | 4/2019 | |
| WO | 2011/071157 A1 | | 6/2011 | |
| WO | 2012/018026 A1 | | 2/2012 | |

OTHER PUBLICATIONS

Machine_English_translation_JP_2011168455_A; Iida et. al.; Near-Infrared Light Cutting Filter Glass; Sep. 1, 2011; EPO; whole document (Year: 2024).*
ISR issued in International Patent Application No. PCT/JP2020/048961, Mar. 23, 2021, translation.
IPRP issued in International Patent Application No. PCT/JP2020/048961, Jun. 28, 2022, translation.
Office Action issued in KR Patent Application No. 10-2022-7022054, Feb. 8, 2024, translation.
Office Action issued in CN Patent Application No. 202080090602.4, Aug. 25, 2023, translation.
Decision of Rejection issued in CN Patent Application No. 202080090602.4, May 30, 2024, translation.
Office Action issued in Japanese Patent Application No. 2021-567712, Jul. 16, 2024, translation.
Office Action issued in CN Patent Application No. 202080090602.4, translation.
Office Action issued in CN Patent Application No. 202080090602.4, Mar. 8, 2024, translation.
Office Action issued in Taiwanese Patent Application No. 109146208, Oct. 4, 2024, Translation.

* cited by examiner

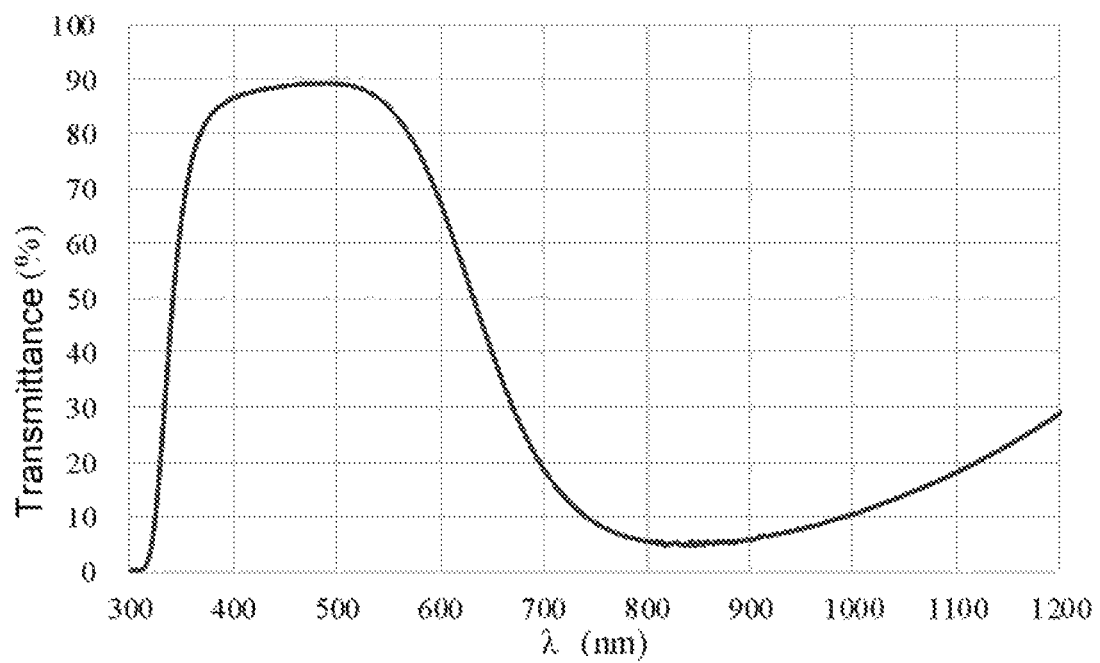

NEAR-INFRARED ABSORBING GLASS AND NEAR-INFRARED CUTOFF FILTER

TECHNICAL FIELD

The present invention relates to near-infrared absorbing glass and a near-infrared cutoff filter.

BACKGROUND ART

The near-infrared cutoff filter has the function of cutting unnecessary near-infrared light (wavelength of 700 to 1200 nm) in the sensitive wavelength region of an imaging element such as a CCD or a CMOS, for the purpose of causing light that strikes the imaging element to exhibit a light wavelength distribution corresponding to a relative luminous efficiency curve of humans. The near-infrared cutoff filter is generally provided directly before the imaging element.

Near-infrared cutoff filters having near-infrared absorbing glass as a substrate, and obtained through polishing on a flat plate, are widely used.

Near-infrared absorbing glass generally contains Cu ions. FIG. 1 illustrates an example of a spectral transmission characteristic of near-infrared absorbing glass. The present invention is not meant to be limited in any way by FIG. 1. The light absorption characteristic in the vicinity of a wavelength from 700 to 1200 nm is brought out by Cu ions ($Cu^{2+}$) in the glass. From among the foregoing, phosphate glass containing Cu ions can exhibit near-infrared absorption characteristics over a wide wavelength region, provided by Cu ions ($Cu^{2+}$); accordingly, such phosphate glass is useful as glass for a near-infrared cutoff filter (see, for example, PTL 1).

CITATION LIST

Patent Literature

[PTL 1] Japanese Patent Application Publication No. 2019-38719

In a transmittance curve at a wavelength from 600 nm in FIG. 1, the wavelength at which the transmittance is 50% is referred to as a "half value", which is one of the main standards of near-infrared cutoff filters. The half value varies depending on the specifications of the filter, but is often set to lie in a wavelength range from 600 nm to 650 nm. General methods for setting the half value to a desired value include a method that involves adjusting either the plate thickness of a glass substrate, or adjusting the concentration of Cu ions ($Cu^{2+}$) in the glass, according to the Lambert-Beer law.

SUMMARY OF INVENTION

Technical Problem

Near-infrared cutoff filters are required to exhibit excellent ability of cutting near-infrared rays (that is, to exhibit low transmittance towards near-infrared light while having a desired half value) and to exhibit high transmittance towards visible light (wavelengths from 400 to 600 nm).

In recent years, smaller sizes and higher performance have come to be demanded from imaging element modules that are mounted on smartphones and the like; to that end, near-infrared cutoff filters are required to be thinner. In order to reduce thickness while maintaining the ability to cut near infrared rays, it is necessary to increase the concentration of Cu ions ($Cu^{2+}$) in the glass. As is known, however, simply increasing to that end the ratio of a Cu component in the glass starting material entails an increase in $Cu^+$ formed through reduction of $Cu^{2+}$ during melting, and leads to a drop of transmittance, particularly in the vicinity of the wavelength 400 nm.

In order to maintain a transmittance characteristic under various usage environments, moreover, it is desirable for the near-infrared cutoff filter to have high chemical durability (that is, excellent weatherability) in high-temperature, high-humidity environments.

In view of the above, one aspect of the present invention aims at providing near-infrared absorbing glass having excellent near-infrared ray cutting ability, high visible light transmittance, and excellent weatherability, and to provide a near-infrared cutoff filter comprised of such near-infrared absorbing glass.

Solution to Problem

The present inventors assessed glass composition from the two standpoints below, with a view to increasing visible light transmittance.

(1) A glass composition that affords a desired half value and sufficient near-infrared ray cutting ability, even with a smaller amount of Cu than in conventional glass compositions.

(2) A glass composition that exhibits better meltability of a starting material batch than that of conventional glass compositions, since melting/molding of glass at a lower temperature is effective in terms of suppressing the generation of $Cu^+$ during melting.

Regarding (1), the present inventors envisaged a complex glass skeleton in which $P_2O_5$ is disposed around $Cu^{2+}$, and found that, by reducing the average valence of monovalent and divalent ions, being intermediate components other than the glass skeleton, it becomes possible to suppress inflow of electrons into $Cu^{2+}$, that is, to suppress generation of $Cu^+$, and at the same time, to reduce the amount of Cu necessary for achieving a desired half value, through shifting of the light absorption wavelength region of $Cu^{2+}$ to a shorter wavelength.

Regarding (2), the present inventors found that the meltability of a glass starting material batch can be increased, and melting/molding can be accomplished at a lower temperature than in conventional instances, by prescribing the proportion of network-forming components such as Al and P in the glass to be a given or lower value.

The present inventors further found that, by prescribing the ratio of O and P in the glass as a whole to be a given or higher value, it becomes possible to reduce the amount of Cu required for achieving a desired half value, and it becomes also possible to increase weatherability, by suppressing formation of crosslinked bonds of P—O—P, which exhibit poor water resistance.

That is, one aspect of the present invention relates to near-infrared absorbing glass (hereafter, also simply referred to as "glass"),
  that contains at least,
  as constituent ions,
  P ions;
  Cu ions;
  O ions;
  one or more ions selected from the group consisting of Li ions, Na ions and K ions; and
  one or more ions selected from the group consisting of Mg ions, Ca ions, Sr ions and Ba ions, wherein, in a glass composition expressed in cation %,
the content of Cu ions is 15.0 cation % or lower;
the content of P ions is 55.0 cation % or lower;
a cation ratio of the total content of Al ions and P ions relative to the total content of Mg ions, Ca ions, Sr ions, Ba ions, Zn ions and Cu ions ((Al ions+P ions)/(Mg ions+Ca ions+Sr ions+Ba ions+Zn ions+Cu ions)) is 5.300 or lower;
a cation ratio of the total content of Mg ions, Ca ions, Sr ions and Ba ions relative to the total content of Li ions, Na ions and K ions ((Mg ions+Ca ions+Sr ions+Ba ions)/(Li ions+Na ions+K ions)) is 0.100 or higher;
an average valence of cations excluding Cu ions and P ions is lower than 1.500; and
in a glass composition expressed in anion %,
the content of O ions is 85.0 anion % or higher, and
a ratio of the content of O ions relative to the content of P ions (O ions/P ions) is 3.300 or higher.

By having the above glass composition, the above near-infrared absorbing glass can exhibit excellent near-infrared ray cutting ability, high visible light transmittance, and excellent weatherability and meltability.

Effects of Invention

One aspect of the present invention can provide near-infrared absorbing glass excellent in near-infrared ray cutting ability, exhibiting high visible light transmittance, as well as excellent in weatherability and meltability. A further aspect of the present invention can provide a near-infrared cutoff filter comprised of such near-infrared absorbing glass.

BRIEF DESCRIPTION OF DRAWINGS

FIG. 1 illustrates an example of a spectral transmission characteristic of near-infrared absorbing glass.

DESCRIPTION OF EMBODIMENTS

[Near-Infrared Absorbing Glass]

In the present invention and the present description, the term near-infrared absorbing glass denotes glass having the property of absorbing at least light having a wavelength in the entirety or part of the near-infrared wavelength region (wavelength from 700 to 1200 nm). The near-infrared absorbing glass according to one aspect of the present invention contains O ions (oxygen ions) as a constituent ion, and hence the glass can be an oxide glass. The term oxide glass denotes glass where the main network-forming component of glass is an oxide. Further, the near-infrared absorbing glass according to one aspect of the present invention contains P ions (phosphorus ions), together with O ions (oxygen ions), as constituent ions, and accordingly can be a phosphate glass.

The near-infrared absorbing glass will be explained in detail next.

<Glass Composition>

In the present invention and the present description, the content and total content of cations (cation components) will be denoted by cation %, unless otherwise indicated, and the content and total content of anions (anion components) will be denoted by anion %, not indicated.

The notation "cation %" is herein a value calculated as "(number of cations of interest/total number of cations in glass components)×100", and signifies a molar percentage of the amount of cations of interest relative to the total amount of cations.

The notation "anion %" is herein a value calculated as "(number of anions of interest/total number of anions in glass components)×100", and signifies a molar percentage of the amount of anions of interest relative to the total amount of anions.

Molar ratios of contents of respective cations are equal to the ratios of contents in cation % of the cations of interest, and molar ratios of contents of respective anions are equal to the ratios of contents in anion % of the anions of interest.

The molar ratio of the content of a cation and the content of an anion is the ratio (in mol %) of the content of the component of interest relative to 100 mol % as the total amount of all the cations and all the anions.

The contents of respective components can be quantified in the form of the content ratio (mass % of the element) included in the glass, in accordance with a known method, for example, inductively coupled plasma atomic emission spectroscopy (ICP-AES), inductively coupled plasma mass spectrometry (ICP-MS), ion chromatography and the like. The content of each element in mol % can be worked out by dividing the content ratio (element mass %) of the given element by the atomic weight thereof; cation % and anion % can then be determined on the basis of the obtained value.

In the present invention and the present description, an instance where the content of a constituent component is 0%, or the constituent component is not present, or has not been introduced, signifies that there is substantially no content of the constituent component, although the constituent component may be permissibly present at the level of unavoidable impurity. The term unavoidable impurity level signifies, for example, less than 0.01%.

The formal valence of each cation is used to determine the average valence of cations, described in detail further on. The term formal valence for an oxide of a cation of interest is the valence required in order for the oxide to maintain electrical neutrality, with −2 as the valence of the oxygen ions (anions) that make up the oxide, and can be uniquely determined on the basis of the chemical formula of the oxide. In the case of, for example, Cu ions, the valence of Cu is +2 in order to maintain the electrical neutrality of $O^{2-}$ and Cu included in the chemical formula of the oxide CuO. In the case of, for example, P ions, the valence of P is +5 in order to maintain the electrical neutrality of $O^{2-}$ and P included in the chemical formula of the oxide P2O5. Generalized in a numerical expression, the formal valence of a cation $A_XO_Y$ is thus "+2X/Y". Therefore, the valence of cations need not be analyzed when analyzing the glass composition. Also, the valence of anions (for example, the valence of oxygen ions is −2) is a formal valence based on the idea according to which oxygen ions accept two electrons to acquire a closed shell structure. Therefore, the valence of anions need not be analyzed when analyzing the glass composition. Although part of $Cu^{2+}$ can become $Cu^+$ at the time of melting, as described above, the amount involved is nevertheless small; in working out the average valence, therefore, the valence of Cu can be regarded as +2 in the totality.

(Cations)

P ions are a network-forming component of the glass. From the viewpoint of enhancing weatherability and increasing meltability, the content of P ions in the above glass is 55.0% or lower, preferably 53.0% or lower, more preferably 51.0% or lower, yet more preferably 50.0% or lower, even more preferably 49.0% or lower, even yet more preferably 48.0% or lower, even yet more preferably 47.0% or lower, even yet more preferably 46.0% or lower, even yet more preferably 45.0% or lower, and even yet more preferably 44.0% or lower. The above glass contains P ions as constituent ions, and accordingly the content of P ions exceeds 0%. From the viewpoint of increasing devitrification resistance at the time of glass melting and increasing the mechanical strength of the glass, the content of P ions is preferably 30.0% or higher, more preferably 32.0% or higher, yet more preferably 34.0% or higher, even more preferably 36.0% or higher, even yet more preferably 38.0% or higher, even yet more preferably 39.0% or higher, even yet more preferably 40.0% or higher, and even yet more preferably 41.0% or higher. The formal valence of P ions is +5.

Further, Cu ions are a component that contributes to imparting near-infrared ray cutting ability to the glass. From the viewpoint of increasing visible light transmittance, the content of Cu ions in the above glass is 15.0% or lower, preferably 13.0% or lower, more preferably 11.0% or lower, and yet more preferably 9.0% or lower. The above glass contains Cu ions as constituent ions, and accordingly the content of Cu ions exceeds 0%. In order to achieve sufficient near-infrared ray cutting ability, the content of Cu ions is preferably 0.5% or higher, more preferably 1.5% or higher, and yet more preferably 2.5% or higher.

As described in detail below, in one embodiment, the above glass can be used as glass for near-infrared cutoff filters, having a thickness of 0.25 mm or less.

In a glass (hereafter, also referred to as "Glass I") suitable for a near-infrared cutoff filter the thickness of which is comparatively small within the above thickness range, the content of Cu ions is preferably 1.5% or higher, and increasingly more preferably is 1.7% or higher, 1.9% or higher, 2.1% or higher, 2.3% or higher, 2.5% or higher, 2.7% or higher, 2.9% or higher, 3.1% or higher, 3.3% or higher, 3.5% or higher, 3.7% or higher, 3.9% or higher, 4.1% or higher, 4.5% or higher, 4.7% or higher, 4.9% or higher, or 5.1% or higher.

From the viewpoint of further increasing the visible light transmittance of such a near-infrared cutoff filter, the content of Cu ions in Glass I is preferably 15.0% or lower, and increasingly more preferably is 13.0% or lower, 11.0% or lower, 10.0% or lower, 9.0% or lower, 8.5% or lower, 8.0% or lower, 7.5% or lower, 7.0% or lower, 6.5% or lower, or 6.0% or lower.

A preferred value of Cu ions to be contained in glass suitable for a near-infrared cutoff filter having a desired thickness can be worked out by multiplying the above preferred ranges by (0.11/d). Herein d denotes the thickness for which a preferred value of Cu ions is to be determined and the units are mm.

In glass (hereafter, also referred to as "Glass II") suitable for a comparatively thick near-infrared cutoff filter within a thickness in a range up to 0.25 mm, a preferred range of Cu ions in one embodiment can be worked out by multiplying the above preferred ranges by (0.11/d).

In one embodiment of Glass II, the content of Cu ions is preferably 0.5% or higher, and increasingly more preferably is 0.7% or higher, 0.9% or higher, 1.1% or higher, 1.3% or higher, 1.5% or higher, 1.7% or higher, 1.9% or higher, 2.1% or higher, 2.3% or higher, or 2.5% or higher. From the viewpoint of further increasing the visible light transmittance of such a near-infrared cutoff filter, the content of Cu ions of Glass II, in one embodiment, is preferably 10.0% or lower, and increasingly more preferably is 9.0% or lower, 8.5% or lower, 8.0% or lower, 7.5% or lower, 7.0% or lower, 6.5% or lower, 6.0% or lower, 5.5% or lower, 5.0% or lower, 4.5% or lower, 4.0% or lower, or 3.5% or lower. The formal valence of Cu ions is +2.

The content of Li ions in the above glass can be 0%, 0% or higher, or higher than 0%. Li ions are a component having the function of improving devitrification resistance of the glass at the time of melting/molding. From the viewpoint of increasing the meltability of glass, the content of Li ions is preferably 10.0% or higher, more preferably 12.0% or higher, yet more preferably 13.0% or higher, even more preferably 14.0% or higher, even yet more preferably 15.0% or higher, even yet more preferably 16.0% or higher, even yet more preferably 17.0% or higher, even yet more preferably 18.0% or higher, even yet more preferably 20.0% or higher, even yet more preferably 20.5% or higher, and even yet more preferably 21.0% or higher, and increasingly more preferably is 21.5% or higher, 22.0% or higher, 22.5% or higher, 23.0% or higher, 23.5% or higher, 24.0% or higher, 24.5% or higher, 25.0% or higher, 25.5% or higher, 26.0% or higher. From the viewpoint of enhancing the chemical durability and/or processability of the glass, or increasing the liquidus viscosity of the glass, the content of Li ions is preferably 32.0% or lower, more preferably 31.0% or lower, yet more preferably 30.5% or lower, even more preferably 30.0% or lower, even yet more preferably 29.5% or lower, even yet more preferably 29.0% or lower, even yet more preferably 28.5% or lower, even yet more preferably 28.0% or lower, and even yet more preferably 27.5% or lower. The formal valence of Li ions is +1. From the above viewpoints, in one embodiment, preferably there holds "content of Li ions>content of Na ions", and preferably there holds "content of Li ions>content of K ions".

The content of Na ions in the above glass can be 0%, 0% or higher, or higher than 0%. Na ions as well are a component having the function of improving glass meltability. In one embodiment, there is preferably used mainly Li or K. Specifically, from the viewpoint of enhancing devitrification resistance of the glass, increasing viscosity at the liquidus temperature, and enhancing chemical durability and/or processability, the content of Na ions is preferably 30.0% or lower, more preferably 28.0% or lower, yet more preferably 27.0% or lower, even more preferably 25.0% or lower, even yet more preferably 23.0% or lower, even yet more preferably 21.0% or lower, even yet more preferably 19.0% or lower, even yet more preferably 17.0% or lower, even yet more preferably 15.0% or lower, and even yet more preferably 13.0% or lower, and increasingly more preferably is 11.0% or lower, 10.0% or lower, 9.0% or lower, 8.0% or lower, 7.0% or lower, 6.0% or lower, 5.0% or lower, 4.0% or lower, 3.0% or lower, 2.0% or lower, 1.0% or lower, or 0.5% or lower. The formal valence of Na ions is +1. From the above viewpoints, in one embodiment, preferably there holds "content of Na ions <content of Li ions", and preferably there holds "content of Na ions <content of K ions".

The content of K ions in the above glass can be 0%, 0% or higher, or higher than 0%. K ions as well are a component having the function of increasing the meltability of the glass, and further improving devitrification resistance at the time of melting/molding. From the above viewpoints, the content of K ions is preferably 3.0% or higher, more preferably 4.0% or higher, yet more preferably 5.0% or higher, even more preferably 6.0% or higher, even yet more preferably 7.0% or higher, even yet more preferably 8.0% or higher, even yet more preferably 9.0% or higher, and even yet more preferably 10.0% or higher. From the viewpoint of increasing the viscosity of the glass at the liquidus temperature, and increasing chemical durability and/or processability, the content of K ions is preferably 20.0% or lower, more preferably 19.0% or lower, yet more preferably 17.0% or lower, even more preferably 15.0% or lower, even yet more preferably 14.5% or lower, even yet more preferably 14.0% or lower, even yet more preferably 13.5% or lower, even yet more preferably 13.0% or lower, even yet more preferably 12.5% or lower, and particularly preferably 12.3% or lower. The formal valence of K ions is +1. In one embodiment, preferably there holds "content of K ions<content of Li ions", and preferably there holds "content of K ions>content of Na ions", from the above viewpoints.

The above glass may contain, as constituent ions, one or more ions selected from the group consisting of Li ions, Na ions and K ions. That is, in one embodiment, the above glass may contain just Li ions; in another embodiment, the above glass may contain just Na ions; in another embodiment, the above glass may contain just K ions; in another embodiment, the above glass may contain Li ions and Na ions; in another embodiment, the above glass may contain Li ions and K ions; in yet another embodiment, the above glass may contain Na ions and K ions; and in yet another embodiment, the above glass may contain Li ions, Na ions and K ions.

Besides Li ions, Na ions and K ions, the above glass may contain other alkali metal ions. Examples of other alkali metal ions include Cs ions. The content of Cs ions in the above glass can be 0%, 0% or higher, or higher than 0%. The formal valence of Cs ions is +1.

From the viewpoint of lowering the average valence and increasing visible light transmittance, the total content of Li ions, Na ions and K ions is preferably 19.0% or higher, more preferably 21.0% or higher, yet more preferably 23.0% or higher, even more preferably 25.0% or higher, even yet more preferably 27.0% or higher, even yet more preferably 28.0% or higher, even yet more preferably 29.0% or higher, even yet more preferably 30.0% or higher, even yet more preferably 30.5% or higher, and even yet more preferably 31.0% or higher, and increasingly more preferably is 32.0% or higher, 32.5% or higher, 33.0% or higher, 33.5% or higher, 34.0% or higher, 34.5% or higher, 35.0% or higher, 35.5% or higher, 36.0% or higher, 36.5% or higher, 37.0% or higher, 37.5% or higher, 38.0% or higher, 38.5% or higher, 39.0% or higher, or 39.1% or higher. From the viewpoint of further increasing weatherability, suppressing drops in glass transition temperature and/or suppressing drops in viscosity at the liquidus temperature, the total content of Li ions, Na ions and K ions is preferably 56.0% or lower, more preferably 54.0% or lower, yet more preferably 52.0% or lower, even more preferably 50.0% or lower, even yet more preferably 48.0% or lower, even yet more preferably 46.0% or lower, and even yet more preferably 45.0% or lower, and increasingly more preferably is 44.0% or lower, 43.0% or lower, 42.5% or lower, 42.0% or lower, 41.5% or lower, 41.0% or lower, 40.5% or lower, 40.0% or lower, or 39.5% or lower.

The content of Mg ions in the above glass can be 0%, 0% or higher, or higher than 0%. From the viewpoint of suppressing drops in the liquidus viscosity of the glass, reinforcing the mechanical strength of the glass, and/or reinforcing chemical resistance, the content of Mg ions is preferably 0.3% or higher, more preferably 0.5% or higher, yet more preferably 0.8% or higher, even more preferably 1.1% or higher, and even yet more preferably 1.3% or higher. From the viewpoint of further increasing devitrification resistance at the time of melting/molding, the content of Mg ions is preferably 7.0% or lower, more preferably 6.0% or lower, yet more preferably 5.0% or lower, even more preferably 4.0% or lower, even yet more preferably 3.5% or lower, even yet more preferably 3.0% or lower, even yet more preferably 2.5% or lower, even yet more preferably 2.0% or lower, and even yet more preferably 1.8% or lower. The formal valence of Mg ions is +2. In one embodiment, preferably there holds "content of Mg ions <content of Ca ions", and preferably there holds "content of Mg ions <content of Ba ions", from the above viewpoints.

The content of Ca ions in the above glass can be 0%, 0% or higher, or higher than 0%. From the viewpoint of suppressing drops in the liquidus viscosity of the glass, reinforcing the mechanical strength of the glass, and reinforcing chemical resistance, the content of Ca ions is preferably 1.3% or higher, more preferably 1.5% or higher, yet more preferably 1.7% or higher, even more preferably 1.9% or higher, even yet more preferably 2.1% or higher, even yet more preferably 2.3% or higher, even yet more preferably 2.5% or higher, and particularly preferably 2.7% or higher. From the viewpoint of further increasing devitrification resistance at the time of melting/molding, the content of Ca ions is preferably 9.0% or lower, more preferably 8.0% or lower, yet more preferably 7.0% or lower, even more preferably 6.0% or lower, even yet more preferably 5.0% or lower, even yet more preferably 4.5% or lower, even yet more preferably 4.2% or lower, even yet more preferably 3.9% or lower, even yet more preferably 3.7% or lower, and particularly preferably 3.5% or lower. The formal valence of Ca ions is +2. In one embodiment, preferably there holds "content of Ca ions>content of Mg ions", and preferably there holds "content of Ca ions>content of Sr ions", from the above viewpoints.

The content of Sr ions in the above glass can be 0%, 0% or higher, or higher than 0%. From the viewpoint of suppressing drops in the liquidus viscosity of the glass, reinforcing the mechanical strength of the glass, and reinforcing chemical resistance, the content of Sr ions is preferably 0.2% or higher, more preferably 0.4% or higher, yet more preferably 0.6% or higher, even more preferably 0.8% or higher, and even yet more preferably 0.9% or higher. From the viewpoint of further increasing devitrification resistance at the time of melting/molding, the content of Sr ions is preferably 4.0% or lower, more preferably 3.5% or lower, yet more preferably 3.3% or lower, even more preferably 3.1% or lower, even yet more preferably 2.7% or lower, even yet more preferably 2.5% or lower, even yet more preferably 2.3% or lower, even yet more preferably 2.1% or lower, even yet more preferably 1.9% or lower, even yet more preferably 1.7% or lower, and particularly preferably 1.5% or lower. The formal valence of Sr ions is +2. In one embodiment, preferably there holds "content of Sr ions<content of Ca ions", and preferably there holds "content of Sr ions<content of Ba ions", from the above viewpoints.

The content of Ba ions in the above glass can be 0%, 0% or higher, or higher than 0%. From the viewpoint of suppressing drops in the liquidus viscosity of the glass, reinforcing the mechanical strength of the glass, and reinforcing chemical resistance, the content of Ba ions is preferably 1.5% or higher, more preferably 2.5% or higher, yet more preferably 2.9% or higher, even more preferably 3.1% or higher, even yet more preferably 3.3% or higher, and even yet more preferably 3.5% or higher. From the viewpoint of further increasing devitrification resistance at the time of melting/molding, the content of Ba ions is preferably 10.0% or lower, more preferably 9.5% or lower, yet more preferably 9.0% or lower, even more preferably 8.5% or lower, even yet more preferably 8.0% or lower, even yet more preferably 7.5% or lower, even yet more preferably 7.0% or lower, even yet more preferably 6.5% or lower, even yet more preferably 6.0% or lower, even yet more preferably, 5.6% or lower, and even yet more preferably 5.3% or lower, and further is, increasingly more preferably, 5.0% or lower, 4.7% or lower, 4.5% or lower, or 4.3% or lower. The formal valence of Ba ions is +2. In one embodiment, preferably there holds "content of Ba ions>content of Ca ions", and preferably there holds "content of Ba ions>content of Sr ions", from the above viewpoints.

The above glass contains one or more ions selected from the group consisting of Mg ions, Ca ions, Sr ions and Ba ions. From the viewpoint of lowering the average valence and increasing visible light transmittance, the total content of Mg ions, Ca ions, Sr ions and Ba ions is preferably low.

From the above viewpoint, and from the viewpoint of further increasing meltability, the total content of Mg ions, Ca ions, Sr ions and Ba ions is preferably 20.0% or lower, more preferably 19.0% or lower, yet more preferably 18.0% or lower, even more preferably 17.5% or lower, even yet more preferably 17.0% or lower, even yet more preferably 16.5% or lower, even yet more preferably 16.0% or lower, even yet more preferably 15.5% or lower, even yet more preferably 15.0% or lower, even yet more preferably, 14.5% or lower, and even yet more preferably 14.0% or lower, and increasingly more preferably is 13.5% or lower, 13.0% or lower, 12.5% or lower, 12.0% or lower, 11.0% or lower, 10.5% or lower, or 10.0% or lower. From the viewpoint of suppressing drops in liquidus temperature, and enhancing weatherability, the total content of Mg ions, Ca ions, Sr ions and Ba ions is preferably 3.0% or higher, more preferably 4.0% or higher, yet more preferably 4.5% or higher, even more preferably 5.0% or higher, even yet more preferably 5.5% or higher, even yet more preferably 6.0% or higher, even yet more preferably 6.5% or higher, even yet more preferably 7.0% or higher, and even yet more preferably 7.5% or higher, and increasingly more preferably is 8.0% or higher, 8.5% or higher, or 9.0% or higher.

From the viewpoint of suppressing drops in viscosity at the liquidus temperature, increasing mechanical strength, and/or suppressing drops in glass transition temperature, a cation ratio of the total content of Mg ions, Ca ions, Sr ions and Ba ions relative to the total content of Li ions, Na ions and K ions in the above glass ((Mg ions+Ca ions+Sr ions+Ba ions)/(Li ions+Na ions+K ions)) is 0.100 or higher, preferably 0.105 or higher, more preferably 0.110 or higher, yet more preferably 0.115 or higher, even more preferably 0.120 or higher, even yet more preferably 0.125 or higher, and even yet more preferably 0.130 or higher, and increasingly more preferably is 0.160 or higher, 0.180 or higher, 0.200 or higher, or 0.220 or higher. Suppressing the decrease in viscosity at the liquidus temperature is preferable from the viewpoint of enhancing the moldability of the glass. From the viewpoint of further increasing meltability and/or visible light transmittance, the above cation ratio ((Mg ions+Ca ions+Sr ions+Ba ions)/(Li ions+Na ions+K ions)) is preferably 0.650 or lower, more preferably 0.620 or lower, yet more preferably 0.590 or lower, even more preferably 0.560 or lower, even yet more preferably 0.530 or lower, even yet more preferably 0.500 or lower, even yet more preferably 0.460 or lower, even yet more preferably 0.430 or lower, even yet more preferably 0.400 or lower, and even yet more preferably 0.370 or lower, and increasingly more preferably is 0.350 or lower, 0.320 or lower, 0.310 or lower, 0.300 or lower, 0.295 or lower, 0.290 or lower, 0.287 or lower, or 0.285 or lower.

A higher melting temperature of the glass makes generation of $Cu^+$ more likely, and entails a drop in visible light transmittance; therefore, the above cation ratio preferably lies within the above ranges.

The content of Al ions in the above glass can be 0%, 0% or higher, or higher than 0%. From the viewpoint of suppressing drops in Tg, increasing mechanical strength, and enhancing weatherability, the content of Al ions is preferably 1.0% or higher, more preferably 1.3% or higher, yet more preferably 1.5% or higher, even more preferably 1.7% or higher, even yet more preferably 1.9% or higher, even yet more preferably 2.1% or higher, even yet more preferably 2.3% or higher, and even yet more preferably 2.5% or higher. From the viewpoint of further increasing the meltability of starting materials and further suppressing generation of $Cu^+$, the content of Al ions is preferably 8.0% or lower, more preferably 7.0% or lower, yet more preferably 6.5% or lower, even more preferably 6.0% or lower, even yet more preferably 5.5% or lower, even yet more preferably 5.3% or lower, even yet more preferably 5.0% or lower, even yet more preferably 4.7% or lower, and even yet more preferably 4.5% or lower, and increasingly more preferably is 4.0% or lower, 2.5% or lower, or 2.0% or lower. The formal valence of Al ions is +3. The content of Al ions is preferably low, from the viewpoint of lowering the average valence and increasing visible light transmittance.

From the viewpoint of increasing the thermal stability and the mechanical strength of the glass, the total content of Al ions and P ions (Al ions+P ions) in the above glass is preferably 40.0% or higher, more preferably 41.0% or higher, yet more preferably 42.0% or higher, even more preferably 42.5% or higher, even yet more preferably 43.0% or higher, even yet more preferably 44.0% or higher, even yet more preferably 44.5% or higher, and even yet more preferably 45.0% or higher. From the viewpoint of further increasing the meltability of starting materials and further suppressing generation of $Cu^+$, the above total content (Al ions+P ions) is preferably 55.0% or lower, more preferably 54.0% or lower, yet more preferably 53.0% or lower, even more preferably 52.0% or lower, even yet more preferably 51.0% or lower, even yet more preferably 50.0% or lower, even yet more preferably 49.5% or lower, even yet more preferably 49.0% or lower, even yet more preferably, 48.5% or lower, and even yet more preferably 48.0% or lower, and increasingly more preferably is 47.0% or lower, 46.5% or lower, 46.2% or lower, or 46.0% or lower.

The content of Zn ions in the above glass can be 0%, 0% or higher, or higher than 0%. From the viewpoint of lowering the Tg of the glass, Zn ions can be introduced, instead of the above Mg and/or Ca and/or Sr and/or Ba, at a content such that Zn ions do not significantly impact the effect of the various components. From the viewpoint of weatherability, however, the content of Zn ions is preferably 8.7% or lower, more preferably 8.5% or lower, yet more preferably 8.3% or lower, even more preferably 8.0% or lower, even yet more preferably 7.7% or lower, even yet more preferably 7.5% or lower, even yet more preferably 7.3% or lower, even yet more preferably 7.1% or lower, even yet more preferably, 6.5% or lower, and even yet more preferably 6.0% or lower, and increasingly more preferably is 5.5% or lower, 5.0% or lower, 4.0% or lower, 3.0% or lower, 2.0% or lower, or 1.0% or lower. The formal valence of Zn ions is +2.

From the viewpoint of the weatherability of the glass, the cation ratio of Zn ions relative to the total content of Mg ions, Ca ions, Sr ions, Ba ions and Zn ions (Zn ions/(Mg ions+Ca ions+Sr ions+Ba ions+Zn ions)) in the above glass is preferably 0.600 or lower, more preferably 0.580 or lower, yet more preferably 0.570 or lower, even more preferably 0.560 or lower, and increasingly more preferably is 0.550 or lower, 0.540 or lower, 0.530 or lower, 0.520 or lower, 0.510 or lower, 0.505 or lower, 0.500 or lower, 0.498 or lower, 0.496 or lower, 0.400 or lower, 0.300 or lower, 0.200 or lower, 0.100 or lower, 0.080 or lower, 0.060 or lower, 0.040 or lower, or 0.020 or lower. The above cation ratio (Zn ions/(Mg ions+Ca ions+Sr ions+Ba ions+Zn ions)) may be 0, or may be 0.000.

From the viewpoint of increasing the meltability of the starting materials and suppressing generation of $Cu^+$, the cation ratio of the total content of Al ions and P ions relative to the total content of Mg ions, Ca ions, Sr ions, Ba ions, Zn ions and Cu ions ((Al ions+P ions)/(Mg ions+Ca ions+Sr ions+Ba ions+Zn ions+Cu ions)) in the above glass is 5.3 or lower, preferably 5.1 or lower, more preferably 4.9 or lower, yet more preferably 4.7 or lower, even more preferably 4.5 or lower, and increasingly more preferably is 4.3 or lower, 4.1 or lower, 3.9 or lower, 3.7 or lower, 3.5 or lower, 3.3 or lower, or 3.1 or lower. From the viewpoint of increasing the thermal stability and increasing the mechanical strength of the glass, the above cation ratio ((Al ions+P ions)/(Mg ions+Ca ions+Sr ions+Ba ions+Zn ions+Cu ions)) is preferably 1.6 or higher, more preferably 1.63 or higher, yet more preferably 1.65 or higher, and increasingly more preferably is 1.68 or higher, 1.7 or higher, 1.75 or higher, 1.8 or higher, 1.85 or higher, 2.00 or higher, 2.20 or higher, 2.40 or higher, 2.60 or higher, or 2.80 or higher.

The above glass may optionally further contain, as cations, one or more cations below.

Introducing a small amount of ions of rare earth atoms, such as Y ions, La ions, Gd ions, Yb ions and the like, can contribute to further increase weatherability, increase chemical resistance, suppress drops in the glass transition temperature, and/or suppress drops in viscosity at the liquidus temperature. The content of ions of the rare earth atoms may each be 0%, 0% or higher, or higher than 0%, and may be 3.0% or lower, 2.0% or lower, 1.0% or lower, or 0.5% or lower. The formal valence of Y ions, La ions, Gd ions and Yb ions is +3.

Ti, Zr, Nb, W and Bi are components which, by being added in small amounts, contribute to increasing the weatherability of the glass, enhancing the chemical resistance, suppressing drops in Tg, and suppressing drops in liquidus viscosity.

The content of Ti ions may be 0%, 0% or higher, or higher than 0%, and is preferably 3.0% or lower, more preferably 2.0% or lower, yet more preferably 1.0% or lower, and even yet more preferably 0.5% or lower. The formal valence of Ti ions is +4.

The content of Zr ions may be 0%, 0% or higher, or higher than 0%, and is preferably 3.0% or lower, more preferably 2.0% or lower, yet more preferably 1.0% or lower, and even yet more preferably 0.5% or lower. The formal valence of Zr ions is +4.

The content of Nb ions may be 0%, 0% or higher, or higher than 0%, and is preferably 3.0% or lower, more preferably 2.0% or lower, yet more preferably 1.0% or lower, and even yet more preferably 0.5% or lower. The formal valence of Nb ions is +5.

The content of W ions may be 0%, 0% or higher, or higher than 0%, and is preferably 3.0% or lower, more preferably 2.0% or lower, yet more preferably 1.0% or lower, and even yet more preferably 0.5% or lower. The formal valence of W ions is +6.

The content of Bi ions may be 0%, 0% or higher, or higher than 0%, and is preferably 3.0% or lower, more preferably 2.0% or lower, yet more preferably 1.0% or lower, and even yet more preferably 0.5% or lower. The formal valence of Bi ions is +3.

From the viewpoint of increasing visible light transmittance of the glass, the average valence of cations excluding Cu ions and P ions in the above glass is lower than 1.500, and is preferably 1.490 or lower, more preferably 1.480 or lower, yet more preferably 1.470 or lower, even more preferably 1.460 or lower, even yet more preferably 1.450 or lower, even yet more preferably 1.440 or lower, and even yet more preferably 1.430 or lower, and increasingly more preferably is 1.420 or lower, 1.410 or lower, 1.400 or lower, 1.390 or lower, 1.380 or lower, 1.370 or lower, 1.360 or lower, or 1.350 or lower. From the viewpoint of suppressing drops in viscosity at the liquidus temperature, the average valence of cations excluding Cu ions and P ions is preferably 1.100 or higher, more preferably 1.1500 or higher, yet more preferably 1.200 or higher, even more preferably 1.250 or higher, even yet more preferably 1.270 or higher, even yet more preferably 1.280 or higher, even yet more preferably 1.290 or higher, and even yet more preferably 1.300 or higher. The composition can be re-adjusted, by referring to the average valence, for example, when modifying the thickness of the glass and/or when modifying the Cu concentration to adjust the wavelength for which transmittance is 50%.

The above average valence of cations excluding Cu ions and P ions can be worked out as a value resulting from dividing the sum total of "cation % content of respective cation×formal valence of that cation", by the total cation content, excluding Cu and P, expressed as cation %. For example, the average valence of glass which, in addition to Cu ions and P ions, contains A cations (formal valence a, content A % in cation %), B cations (formal valence b, content B % in cation %) and C cations (formal valence c, total content C % in cation %), is worked out as "(A×a+B×b+C×c)/(A+B+C)".

The average valence including Cu ions in the above glass can be referred to when modifying the thickness of the glass and/or when modifying the Cu concentration to adjust the wavelength for which transmittance is 50%. From the viewpoint of further increasing visible light transmittance, the average valence of cations excluding only P ions (that is, including Cu ions), worked out in the same way as above, is preferably 1.550 or lower, more preferably 1.540 or lower, yet more preferably 1.530 or lower, even more preferably 1.520 or lower, even yet more preferably 1.510 or lower, and even yet more preferably 1.500 or lower, and increasingly more preferably is 1.490 or lower, 1.480 or lower, 1.470 or lower, 1.460 or lower, 1.450 or lower, 1.440 or lower, 1.430 or lower, 1.420 or lower, 1.410 or lower, or 1.400 or lower. From the viewpoint of suppressing drops in viscosity at the liquidus temperature, the average valence of cations excluding only P ions is preferably 1.300 or higher, more preferably 1.310 or higher, yet more preferably 1.320 or higher, even more preferably 1.330 or higher, even yet more preferably 1.340 or higher, even yet more preferably 1.350 or higher, and even yet more preferably 1.360 or higher.

(Anions)

The above glass contains O ions as constituent ions. From the viewpoint of facilitating homogenization at the time of melting of the glass and increasing productivity, the content of O ions is 85.0% or higher, and preferably 90.0% or higher, more preferably 95.0% or higher, yet more preferably 98.0% or higher, and even yet more preferably 99.0% or higher. In particular, the content of O ions is preferably 100% from the viewpoint of suppressing volatilization during glass melting and suppressing generation of harmful gases during production, while increasing productivity. The formal valence of O ions is −2.

In one embodiment, the above glass may contain just O ions alone, as anions; in another embodiment, the above glass may contain one or more other anions, together with O ions. Examples of other anions include F ions, CL ions, Br ions and I ions. The formal valence of F ions, CL ions, Br ions and I ions is −1.

From the viewpoint of increasing the homogeneity and strength of the glass, the content of F ions is preferably 15.0% or lower, more preferably 10.0% or lower, yet more preferably 5.0% or lower, even more preferably 2.0% or lower, and even yet more preferably 1.0% or lower. In particular, from the viewpoint of suppressing volatilization during glass melting, and suppressing generation of harmful gases during production while increasing productivity, the above glass may contain no F ions.

From the viewpoint of enhancing weatherability, the ratio of the content of O ions relative to the content of P ions in the glass (O ions/P ions) is 3.300 or higher, preferably 3.310 or higher, yet more preferably 3.320 or higher even more preferably 3.330 or higher, and increasingly more preferably is 3.340 or higher, 3.350 or higher, 3.360 or higher, 3.370 or higher, 3.380 or higher, 3.390 or higher, 3.400 or higher, 3.410 or higher, 3.420 or higher, 3.430 or higher, 3.440 or higher, 3.450 or higher, or 3.460 or higher. From the viewpoint of further increasing the near-infrared ray cutting ability and devitrification resistance at the time of melting/molding of the glass, the above ratio (O ions/P ions) is preferably 3.580 or lower, more preferably 3.570 or lower, yet more preferably 3.560 or lower, even more preferably 3.550 or lower, even yet more preferably 3.540 or lower, and even yet more preferably 3.530 or lower, and increasingly more preferably is 3.520 or lower, 3.510 or lower, 3.500 or lower, or 3.490 or lower.

Preferably, the above glass is basically comprised of the above components, but provided that the effect of these components is not impaired, the above glass may also contain other components. It is moreover not ruled out that the above glass may contain unavoidable impurities.

Pb, As, Cd, Tl, Be and Se are all toxic. Preferably, therefore, the above glass does not contain the foregoing as glass components.

Further, U, Th and Ra are all radioactive elements. Preferably, therefore, the above glass does not contain the foregoing as glass components.

Further, V, Cr, Mn, Fe, Co, Ni, Pr, Nd, Pm, Sm, Eu, Tb, Dy, Ho, Er, Tm and Ce may increase coloring in the glass, and can be a source of fluorescence. Accordingly, the total oxide-basis content of these elements in the above glass, referred to an oxide glass, is preferably 10 mass ppm or lower. More preferably, the above glass contains none of these elements as glass components.

Ge, Ta and Gd are expensive starting materials. Preferably, therefore, the above glass does not contain the foregoing as glass components.

Sb ($Sb_2O_3$), Sn ($SnO_2$), Ce ($CeO_2$) and $SO_3$ are elements that can be optionally added and which function as clarifying agents. Among the foregoing, Sb ($Sb_2O_3$) is a clarifying agent having a significant clarifying effect.

Sn ($SnO_2$) and Ce ($CeO_2$) have a less pronounced clarifying effect as compared with Sb ($Sb_2O_3$). Coloring of the glass tends to be exacerbated when such clarifying agents are added in large amounts. In a case where a clarifying agent is to be added, therefore, it is preferable to add Sb ($Sb_2O_3$) taking into consideration the impact on coloring derived from addition of the clarifying agent.

The following content of the components that can function as a clarifying agent is notated on an oxide basis.

The content of $Sb_2O_3$ is notated as an outer percentage. That is, the content of $Sb_2O_3$ relative to 100.0 mass % as the total content of oxides of all glass components other than $Sb_2O_3$, $SnO_2$, $CeO_2$ and $SO_3$ can be, in one embodiment, lower than 1.0 mass %, or lower than 0.5 mass %, or 0.3 mass % or lower, or 0.2 mass % or lower, or 0.15 mass % or lower, or 0.1 mass % or lower, or lower than 0.1 mass %. In one embodiment, the content of $Sb_2O_3$ may be 0 mass %. In another embodiment, the content of $Sb_2O_3$ may exceed 0 mass %. From the viewpoint of increasing visible light transmittance through suppression of coloring derived from reduction of $Cu^{2+}$ during melting, the content of $Sb_2O_3$ preferably exceeds 0 mass %, and increasingly more preferably is 0.01 mass % or higher, 0.03 mass % or higher, 0.05 mass % or higher, 0.08 mass % or higher, or 0.10 mass % or higher.

The content of $SnO_2$ as well is notated as an outer percentage. That is, the content of $SnO_2$ relative to 100.0 mass % as the total content of oxides of all glass components other than $SnO_2$, $Sb_2O_3$, $CeO_2$ and $SO_3$ is preferably lower than 2.0 mass %, more preferably lower than 1.0 mass %, yet more preferably lower than 0.5 mass %, and even more preferably lower than 0.1 mass %. The content of $SnO_2$ may be 0 mass %. The clarity of the glass can be improved by prescribing the content of $SnO_2$ to lie in the above ranges.

The content of $CeO_2$ as well is notated as an outer percentage. That is, the content of $CeO_2$ relative to 100.0 mass % as the total content of oxides of all glass components other than $CeO_2$, $Sb_2O_3$, $SnO_2$ and $SO_3$ is preferably lower than 2.0 mass %, more preferably lower than 1.0 mass %, yet more preferably lower than 0.5 mass %, and even more preferably lower than 0.1 mass %. The content of $CeO_2$ may be 0 mass %. The clarity of the glass can be improved by prescribing the content of $CeO_2$ to lie in the above ranges.

The content of $SO_3$ as well is notated as an outer percentage. That is, the content of $SO_3$ relative to 100.0 mass % as the total content of oxides of all glass components other than $SO_3$, $Sb_2O_3$, $SnO_2$ and $CeO_2$ is preferably lower than 2.0 mass %, more preferably lower than 1.0 mass %, yet more preferably lower than 0.5 mass %, and even more preferably lower than 0.1 mass %. The content of $SO_3$ may be 0 mass %. The clarity of the glass can be improved by prescribing the content of $SO_3$ to lie in the above ranges.

<Physical Properties of Glass>

(Transmittance Characteristic)

The above glass is suitable as a glass for a near-infrared cutoff filter. A half value that is the wavelength at which spectral transmittance is 50%, being a wavelength of 600 nm or longer, can be taken as an index of near-infrared ray cutting ability, and also transmittance T1200 at a wavelength of 1200 nm can be taken as such an index.

The above glass can also exhibit high visible light transmittance. Further, transmittance T400 at a wavelength of 400 nm can be used as index of visible light transmittance.

As described in detail below, in one embodiment, the above glass can be used as glass for near-infrared cutoff filters, having a thickness of 0.25 mm or less.

Glass (Glass I) the thickness of which, within the above thickness range, is suitable for a comparatively thin near-infrared cutoff filter, preferably has a half value of 650 nm or smaller, as a transmittance characteristic on a 0.11 mm thickness basis; and increasingly more preferably, the half value is 647 nm or smaller, 645 nm or smaller, 643 nm or smaller, 641 nm or smaller, 640 nm or smaller, 639 nm or smaller, or 638 nm or smaller.

The half value of the transmittance characteristic of Glass I on a 0.11 mm thickness basis is preferably 600 nm or larger, increasingly more preferably, is 610 nm or larger, 613 nm or larger, 615 nm or larger, 617 nm or larger, 620 nm or larger, 623 nm or larger, 625 nm or larger, or 628 nm or larger.

The transmittance T1200 at a wavelength of 1200 nm of Glass I, as the transmittance characteristic on a 0.11 mm thickness basis, is preferably 42.0% or lower, and increasingly more preferably is 41.0% or lower, 40.0% or lower, 39.0% or lower, 38.5% or lower, 38.0% or lower, 37.5% or lower, 37.0% or lower, 36.5% or lower, 36.0% or lower, 35.5% or lower, or 35.0% or lower.

The transmittance T1200 at a wavelength of 1200 nm, as the transmittance characteristic on a 0.11 mm thickness basis of Glass I, can be, for example, 10.0% or higher, 12.0% or higher, or 14.0% or higher, and is also preferably lower than the values enumerated above, since a lower transmittance can signify a better near-infrared ray cutting ability.

The transmittance T400 at a wavelength of 400 nm of Glass I, as the transmittance characteristic on a 0.11 mm thickness basis, is preferably 68.0% or higher, more preferably 70.0% or higher, and increasingly more preferably is 71.0% or higher, 72.0% or higher, 73.0% or higher, 74.0% or higher, 75.0% or higher, 76.0% or higher, 77.0% or higher, 78.0% or higher, 79.0% or higher, or 80.0% or higher.

The transmittance T400 at a wavelength of 400 nm, as the transmittance characteristic of Glass I on a 0.11 mm thickness basis can be, for example, 98.0% or lower, 97.0% or lower, or 96.0% or lower, and is also preferably higher than the values enumerated above, since a higher transmittance can signify yet higher visible light transparency.

Glass (Glass II) the thickness of which, within the above thickness range, is suitable for a comparatively thick near-infrared cutoff filter, preferably has a half value of 650 nm or smaller, as a transmittance characteristic on a 0.21 mm thickness basis, and increasingly more preferably, the half value is 647 nm or smaller, 645 nm or smaller, 643 nm or smaller, 641 nm or smaller, 640 nm or smaller, 639 nm or smaller, or 638 nm or smaller.

The half value of the transmittance characteristic of Glass II on a 0.21 mm thickness basis is preferably 600 nm or larger, and increasingly more preferably is 610 nm or larger, 613 nm or larger, 615 nm or larger, 617 nm or larger, 620 nm or larger, 623 nm or larger, 625 nm or larger, or 628 nm or larger.

The transmittance T1200 of Glass II at a wavelength of 1200 nm, as the transmittance characteristic on a 0.21 mm thickness basis, is preferably 42.0% or lower, and increasingly more preferably is 41.0% or lower, 40.0% or lower, 39.0% or lower, 38.5% or lower, 38.0% or lower, 37.5% or lower, 37.0% or lower, 36.5% or lower, 36.0% or lower, 35.5% or lower, or 35.0% or lower.

The transmittance T1200 of Glass II at a wavelength of 1200 nm, as the transmittance characteristic on a 0.21 mm thickness basis, can be, for example, 10.0% or higher, 12.0% or higher, or 14.0% or higher, but is also preferably lower than the values enumerated above, since a lower transmittance can signify a better near-infrared ray cutting ability.

The transmittance T400 of Glass II at a wavelength of 400 nm, as the transmittance characteristic on a 0.21 mm thickness basis, is preferably 68.0% or higher, more preferably 70.0% or higher, and increasingly more preferably is 71.0% or higher, 72.0% or higher, 73.0% or higher, 74.0% or higher, 75.0% or higher, 76.0% or higher, 77.0% or higher, 78.0% or higher, 79.0% or higher, or 80.0% or higher.

The transmittance T400 at a wavelength of 400 nm, as the transmittance characteristic of Glass II on a 0.21 mm thickness basis can be, for example, 98.0% or lower, 97.0% or lower, or 96.0% or lower, but is also preferably higher than the values enumerated above, since a higher transmittance can signify yet higher visible light transparency.

The above values of transmittance characteristic are obtained in accordance with the following method.

A glass sample is worked so as to have optically polished flat surfaces that are parallel to each other, and the external transmittance of the sample at a wavelength of 200 to 1200 nm is measured. The external transmittance includes reflection loss of light rays on the surface of the sample.

A spectral transmittance B/A is calculated, where intensity A denotes the intensity of rays perpendicularly incident on one of the optically polished flat surfaces, and intensity B denotes the intensity of rays exiting the other flat surface. A half value $\lambda_T 50$ is herein the wavelength at which the spectral transmittance is 50% at a wavelength of 600 nm or longer. Further, T400 is the spectral transmittance at a wavelength of 400 nm and T1200 is the spectral transmittance at a wavelength of 1200 nm. In a case where the thickness of the glass to be measured is different from the thickness to be converted, the half value $\lambda_T 50$ and converted values of T400 and T1200 can be worked out on the basis of a converted transmittance characteristic obtained through conversion of transmittance at each wavelength $\lambda$, in accordance with the expression below, where d is the thickness of the glass.

$$T(\lambda) = (1-R(\lambda))^2 \times \exp(\log_e((T_0(\lambda)/100)/(1-R(\lambda))^2) \times d/d_0) \times 100$$

In the expression, $T(\lambda)$ is the converted transmittance (%) at wavelength $\lambda$, $T_0(\lambda)$ is the measured transmittance (%) at wavelength $\lambda$, d is the thickness (mm) to be converted, $d_0$ is the thickness of the glass (mm), $R(\lambda)$ is the reflectance at wavelength $\lambda$, as given by $R(\lambda) = ((n(\lambda)-1)/(n(\lambda)+1))^2$, and $n(\lambda)$ is the refractive index at wavelength $\lambda$. The calculation is performed assuming that $n(\lambda)$ and $R(\lambda)$ are constant, namely $n(\lambda)=1.51680$ and $R(\lambda)=0.042165$.

(Weatherability)

By having the composition explained above, the above glass can exhibit excellent weatherability. An evaluation result of weatherability assessed, for example, in accordance with the method described in Examples below can be taken as an index of weatherability, with evaluation results of "⊚" and "○" being preferable herein, and "⊚" being yet more preferable.

(Meltability)

By having the composition explained above, the above glass can exhibit excellent meltability. An evaluation result of meltability assessed, for example, in accordance with the method described in Examples below can be taken as an index of meltability, with an evaluation result of "○" being preferable herein.

(Glass Transition Temperature Tg, and Temperature Tm of Endothermic Reaction Convergence)

The glass transition temperature of the above glass is not particularly limited. For example, from the viewpoint of imparting processability and/or post-process heat resistance, Tg is preferably 300° C. or higher, and increasingly more preferably is 310° C. or higher, 320° C. or higher, 330° C. or higher, 340° C. or higher, or 350° C. or higher.

From the viewpoint of reducing the burden on an annealing furnace and/or a molding apparatus, Tg is preferably 500° C. or lower, and increasingly more preferably is 490° C. or lower, 480° C. or lower, 470° C. or lower, 460° C. or lower, 450° C. or lower, 440° C. or lower, 430° C. or lower, 420° C. or lower, 410° C. or lower, 400° C. or lower, or 390° C. or lower.

A temperature Tm of endothermic reaction convergence of the above glass is not particularly limited, but meltability tends to increase as Tm decreases. In addition, the visible light transmittance of the glass tends to increase as meltability increases. From the above viewpoints, Tm is preferably 870° C. or lower, and increasingly more preferably is 860° C. or lower, 850° C. or lower, 840° C. or lower, 830° C. or lower, 820° C. or lower, 810° C. or lower, 800° C. or lower, 790° C. or lower, 780° C. or lower, 770° C. or lower, 760° C. or lower, or 750° C. or lower.

(Specific Gravity)

The near-infrared cutoff filter is preferably lightweight, since this translates into a lighter element and/or device into which the filter is built. From this standpoint, the specific gravity of the above glass is preferably 3.50 or lower, and increasingly more preferably is 3.45 or lower, 3.40 or lower, 3.35 or lower, 3.30 or lower, 3.25 or lower, 3.20 or lower, 3.15 or lower, 3.10 or lower, or 3.05 or lower.

The specific gravity can be, for example, 2.5 or higher, or 2.6 or higher, and is also preferably lower than the values enumerated above, since a low specific gravity is preferable from the above standpoint.

(Glass Production Method)

The above glass can be obtained by blending, melting and molding various glass starting materials. The description below as well can be referred to concerning the production method.

The above near-infrared absorbing glass is suitable as a glass for near-infrared cutoff filters. The above near-infrared absorbing glass can be further applied also to optical elements (lenses and the like), other than near-infrared cutoff filters, and can be applied to various glass-made articles, and variations thereof.

[Near-Infrared Cutoff Filter]

One aspect of the present invention relates to a near-infrared cutoff filter (hereafter, also simply referred to as "filter") comprised of the above near-infrared absorbing glass.

The glass that makes up the above filter is as described above.

A specific example of a production method of the above filter will be explained below. However, the production method below is exemplary in nature, and is not meant to limit the present invention in any way.

Glass starting materials such as phosphates, oxides, carbonates, nitrates, sulfates and fluorides, used as appropriate, are weighed so as to yield a desired composition, are mixed, and are thereafter melted in a melting vessel such as a platinum crucible or the like, for example, at 800° C. to 1000° C., to yield molten glass. A lid of platinum or the like can also be used at this time in order to suppress volatilization of volatile components. Melting can be performed in the atmosphere; melting can also be carried out in an oxygen atmosphere, or oxygen can be bubbled in the molten glass, in order to suppress changes in the valence of Cu. The glass in a molten state yields homogenized molten glass containing few bubbles (preferably, no bubbles), as a result of stirring and clarifying.

After stirring and clarifying of the molten glass, the glass is poured out and molded to a desired shape. Preferably, the glass is poured out after having been cooled down to a temperature in the vicinity of the liquidus temperature, to increase the viscosity of the glass; by doing so, convection of the discharged glass and striae unlikely occur.

Known methods such as casting, pipe outflow, rolling, pressing and the like can be employed as the glass molding method. The molded glass is transferred to an annealing furnace heated beforehand to around the transition point of the glass, and the glass is slowly cooled down to room temperature. A near-infrared cutoff filter can be produced in this way.

An example of the molding method will be described next. A casting mold is prepared that is configured out of a flat and horizontal bottom surface, a pair of side walls that oppose each other parallelly across that bottom surface, and a weir plate positioned between the pair of side walls and that plugs one opening. Homogenized molten glass is then cast into this casting mold at a constant outflow rate, out of a platinum alloy pipe. The cast molten glass spreads within the casting mold, and becomes shaped into a glass plate that is constrained to a given width by the pair of side walls. The molded glass plate is continuously pulled out through an opening of the casting mold. A large-sized and thick glass block can be molded herein by setting as appropriate molding conditions such as the shape and dimensions of the casting mold, and the outflow rate of the molten glass. The glass molded body thus shaped is transferred to an annealing furnace having been heated beforehand to close to the glass transition temperature, and the glass is then slowly cooled down to room temperature. The glass molded body having had strain eliminated through slow cooling is then machined, for example, by being sliced, ground, polished and the like. A near-infrared cutoff filter having a shape suitable for various purposes, such as a plate shape or a lens shape, can be obtained in this manner. Alternatively, a method may also be employed such that a preform comprised of the glass is formed, and the preform is then softened through heating, and is press-molded (in particular, a precision molding method in which the final article is press-molded, without machining of optical functional surfaces, for example, by grinding, polishing and the like). An optical multilayer film may be formed on the surface of the filter, as needed.

The above near-infrared cutoff filter can have both excellent near-infrared ray cutting ability and high visible light transmittance. Such a near-infrared cutoff filter allows satisfactorily correcting color sensitivity in a semiconductor imaging element.

Further, the above near-infrared cutoff filter can be used in imaging devices by being combined with a semiconductor image sensor. The semiconductor image sensor has a semiconductor imaging element, such as a CCD, CMOS and the like, mounted within a package, with a light-receiving portion of the sensor being covered with a translucent member. The near-infrared cutoff filter can double as a translucent member; alternatively, the translucent member may be separate from the near-infrared cutoff filter.

The above imaging device may also be provided with an optical element such as a lens, prism and the like for forming an image of a subject, on a light-receiving surface of the semiconductor image sensor.

The above near-infrared cutoff filter allows providing an imaging device capable of delivering images of excellent quality, with good color sensitivity correction.

In one embodiment, the above near-infrared cutoff filter can be a near-infrared cutoff filter having a thickness of 0.25 mm or less. The introduction of smartphones in recent years has witnessed a strong trend towards thinner cameras in imaging elements, which in turn has made it desirable for near-infrared cutoff filters to be accordingly thinner. The above near-infrared cutoff filter is also suitable as such a near-infrared cutoff filter. The thickness of the above near-infrared cutoff filter can be 0.24 mm or smaller, 0.23 mm or smaller, 0.22 mm or smaller, 0.21 mm or smaller, 0.20 mm or smaller, 0.19 mm or smaller, 0.18 mm or smaller, 0.17 mm or smaller, 0.16 mm or smaller, 0.15 mm or smaller, 0.14 mm or smaller, 0.13 mm or smaller, or 0.12 mm or smaller. The thickness of the above near-infrared cutoff filter can be, for example, 0.21 mm or 0.11 mm. The thickness of the above near-infrared cutoff filter may be 0.50 mm or larger, but is not limited thereto. In the present invention and the present description, the term "thickness" denotes the thickness of a sample in the region at which transmittance is measured; this thickness can be measured using, for example, a thickness gauge, a micrometer and the like. For example, there may be measured the thickness at substantially the central portion at a position traversed by transmitted light; alternatively, the thickness at a plurality of points within a spot of transmitted light may be measured, and the average value thereof may be adopted.

In terms of the near-infrared ray cutting ability of the above near-infrared cutoff filter, preferably a value calculated as "thickness×Cu concentration" is 0.2000 mol/m$^2$ or higher, and increasingly more preferably is 0.2100 mol/m$^2$ or higher, 0.2200 mol/m$^2$ or higher, 0.2300 mol/m$^2$ or higher, 0.2400 mol/m$^2$ or higher, 0.2500 mol/m$^2$ or higher, 0.2600 mol/m$^2$ or higher, 0.2700 mol/m$^2$ or higher, 0.2800 mol/m$^2$ or higher, 0.2900 mol/m$^2$ or higher, 0.3000 mol/m$^2$ or higher, 0.3100 mol/m$^2$ or higher, 0.3150 mol/m$^2$ or higher, 0.3200 mol/m$^2$ or higher, or 0.3250 mol/m$^2$ or higher, from the viewpoint of achieving an near-infrared cutoff filter exhibiting yet higher near-infrared ray cutting ability.

From the viewpoint of achieving a near-infrared cutoff filter exhibiting yet higher visible light transmittance, the value calculated as "thickness×Cu concentration" is preferably 1.000 mol/m$^2$ or lower, and increasingly more preferably is 0.9800 mol/m$^2$ or lower, 0.9600 mol/m$^2$ or lower, 0.9400 mol/m$^2$ or lower, 0.9200 mol/m$^2$ or lower, 0.9000 mol/m$^2$ or lower, 0.8800 mol/m$^2$ or lower, 0.8600 mol/m$^2$ or lower, 0.8400 mol/m$^2$ or lower, 0.8200 mol/m$^2$ or lower, 0.8000 mol/m$^2$ or lower, 0.7800 mol/m$^2$ or lower, 0.7600 mol/m$^2$ or lower, 0.7400 mol/m$^2$ or lower, 0.7200 mol/m$^2$ or lower, 0.7000 mol/m$^2$ or lower, 0.6800 mol/m$^2$ or lower, 0.6600 mol/m$^2$ or lower, 0.6400 mol/m$^2$ or lower, 0.6200 mol/m$^2$ or lower, 0.6000 mol/m$^2$ or lower, 0.5800 mol/m$^2$ or lower, 0.5600 mol/m$^2$ or lower, 0.5400 mol/m$^2$ or lower, 0.5200 mol/m$^2$ or lower, 0.5000 mol/m$^2$ or lower, 0.4800 mol/m$^2$ or lower, 0.4600 mol/m$^2$ or lower, 0.4800 mol/m$^2$ or lower, 0.4200 mol/m$^2$ or lower, 0.4100 mol/m$^2$ or lower, 0.4000 mol/m$^2$ or lower, 0.3900 mol/m$^2$ or lower, 0.3800 mol/m$^2$ or lower, 0.3700 mol/m$^2$ or lower, 0.3600 mol/m$^2$ or lower, or 0.3500 mol/m$^2$ or lower.

A method for calculating the above "thickness×Cu concentration" will be explained below.

"Thickness×Cu concentration"=(specific gravity of the composition)/(molecular weight of the composition)×(cation % of Cu ions/100)×d/10×10$^4$, where the units are mol/m$^2$, and d is thickness (mm).

The method for calculating the (molecular weight of the composition) in the above expression will be explained next.

The (molecular weight of the composition), for all the components that make up the composition, is the sum total value of (cation-basis molecular weight of respective component)×(cation % of respective component/100), where the units are g/mol.

The method for calculating the (Cation-basis molecular weight of the respective component) of the above expression will be explained next.

(cation basis molecular weight of respective component)=(atomic weight of the element constituting that cation)+(oxygen atomic weight×coefficient corresponding to valence)

The coefficients according to valence are as follows.
Coefficient 0.5, for formal valence +1
Coefficient 1.0, for formal valence +2
Coefficient 1.5, for formal valence +3
Coefficient 2.0, for formal valence +4
Coefficient 2.5, for formal valence +5
Coefficient 3.0, for formal valence +6

The descriptions above pertaining to Glass I and Glass II can be referred to herein concerning the transmittance characteristic of the above near-infrared cutoff filter. Also the physical properties of the above near-infrared cutoff filter can be referred to in the descriptions above pertaining to the above near-infrared absorbing glass.

EXAMPLES

The present invention will be described in further detail below on the basis of Examples. The present invention is, however, not limited to the implementations in Examples.

Examples 1 to 81, Comparative Examples A to F

As glass starting materials, there were weighed and mixed, for example, phosphates, fluorides, carbonates, nitrates, oxides and the like so as to yield 150 g to 300 g of respective glass having the compositions given in Table 1. Each resulting mixture was placed in a platinum crucible or quartz crucible, and was melted for 60 minutes to 180 minutes at 800° C. to 1000° C., with homogenization through stirring and defoaming, followed by pouring into a pre-heated molding mold, to mold the melt to a predetermined shape. The obtained glass molded body was transferred to an annealing furnace heated to about the glass transition temperature, and was cooled slowly down to room temperature. A respective test piece was cut out of each obtained glass, and both faces of the test piece were mirror-polished, to a thickness of about 0.2 mm, after which various evaluations were performed in accordance with the methods below.

[Evaluation Methods]
<Transmittance Characteristic>

The transmittance of each test piece at a wavelength of 200 to 1200 nm was measured using a spectrophotometer. On the basis of the measurement results, the half value (units: nm), transmittance T1200 (units: %) at a wavelength of 1200 nm, and transmittance T400 (units: %) at the wavelength of 400 nm were then worked out, as values on a 0.11 mm thickness basis or on a 0.21 mm thickness basis.

<Glass Transition Temperature Tg, and Temperature Tm of Endothermic Reaction Convergence>

The glass transition temperature Tg and the temperature Tm of endothermic reaction convergence derived from melting were measured at a rate of temperature rise of 10° C./minute using a differential scanning calorimetry analyzer (DSC8270) by Rigaku Corporation.

<Specific Gravity>

The specific gravity was measured in accordance with the Archimedes method.

<Weatherability>

Each test piece was kept in a constant-temperature, constant-humidity tank at a temperature of 85° C. and relative humidity of 85%, for 168 hours. Thereafter, the appearance of the test piece was evaluated visually under a fluorescent lamp. Weatherability was evaluated on the basis of an evaluation result, in accordance with the following criteria.

⊚: No deterioration observed on the surface.

○: Fogging observed on the surface, but without deliquescence.

x: Deliquescence occurred.

<Meltability>

Starting materials (mixture) were weighed and mixed so as to yield 200 g of glass after melting, according to the same formulation as that of the glass starting materials used in order to produce each test piece; thereafter, the mixture was placed in a platinum crucible or a silica glass crucible, and was melted at 1000° C. for 60 minutes. In the results of visual observation, melts obtained without unmelted residue were rated as ○, whereas instances of unmelted residue were rated as x.

The above results are shown in Table 1 (Table 1-1 to Table 1-6), Table 2 (Table 2-1 to Table 2-6), and Table 3 (Table 3-1 to Table 3-6). In the tables, the units of (total) content of cations are cation %, and the units of (total) content of anions are anion %.

TABLE 1-1

| Example No. | P | Li | Na | K | Mg | Ca | Sr | Ba | Al | Zn | Y | La | Ti | Zr |
|---|---|---|---|---|---|---|---|---|---|---|---|---|---|---|
| 1 | 41.38 | 21.94 | 0.00 | 9.70 | 1.62 | 2.33 | 1.26 | 5.26 | 1.28 | 8.19 | 0.00 | 0.00 | 0.00 | 0.00 |
| 2 | 41.38 | 21.94 | 0.00 | 9.70 | 0.00 | 2.33 | 1.26 | 6.88 | 1.28 | 8.19 | 0.00 | 0.00 | 0.00 | 0.00 |
| 3 | 42.53 | 21.50 | 0.00 | 9.51 | 1.59 | 2.28 | 1.24 | 5.15 | 1.26 | 8.03 | 0.00 | 0.00 | 0.00 | 0.00 |
| 4 | 41.38 | 21.94 | 0.00 | 9.70 | 1.62 | 2.33 | 1.26 | 5.26 | 1.28 | 8.19 | 0.00 | 0.00 | 0.00 | 0.00 |
| 5 | 41.38 | 21.94 | 0.00 | 9.70 | 1.62 | 2.33 | 1.26 | 5.26 | 1.28 | 8.19 | 0.00 | 0.00 | 0.00 | 0.00 |
| 6 | 43.80 | 21.03 | 0.00 | 9.30 | 1.56 | 2.23 | 1.21 | 5.04 | 1.23 | 7.85 | 0.00 | 0.00 | 0.00 | 0.00 |
| 7 | 45.15 | 20.53 | 0.00 | 9.08 | 1.52 | 2.18 | 1.18 | 4.92 | 1.20 | 7.67 | 0.00 | 0.00 | 0.00 | 0.00 |
| 8 | 46.57 | 19.99 | 0.00 | 8.84 | 1.48 | 2.12 | 1.15 | 4.79 | 1.17 | 7.47 | 0.00 | 0.00 | 0.00 | 0.00 |
| 9 | 48.09 | 19.42 | 0.00 | 8.59 | 1.42 | 2.06 | 1.12 | 4.65 | 1.14 | 7.25 | 0.00 | 0.00 | 0.00 | 0.00 |
| 10 | 42.53 | 12.56 | 8.94 | 9.51 | 1.59 | 2.28 | 1.24 | 5.15 | 1.26 | 8.03 | 0.00 | 0.00 | 0.00 | 0.00 |
| 11 | 42.99 | 21.33 | 0.00 | 9.44 | 0.00 | 2.26 | 1.23 | 5.11 | 2.83 | 7.97 | 0.00 | 0.00 | 0.00 | 0.00 |
| 12 | 42.99 | 21.33 | 0.00 | 9.43 | 0.00 | 3.30 | 1.80 | 7.47 | 2.83 | 4.00 | 0.00 | 0.00 | 0.00 | 0.00 |
| 13 | 42.98 | 21.33 | 0.00 | 9.44 | 0.00 | 4.36 | 2.37 | 9.84 | 2.83 | 0.00 | 0.00 | 0.00 | 0.00 | 0.00 |
| 14 | 42.99 | 21.33 | 0.00 | 9.44 | 0.00 | 2.26 | 1.23 | 5.11 | 2.83 | 8.59 | 0.00 | 0.00 | 0.00 | 0.00 |
| 15 | 42.99 | 21.33 | 0.00 | 9.44 | 0.00 | 2.26 | 1.23 | 5.11 | 2.83 | 8.28 | 0.00 | 0.00 | 0.00 | 0.00 |
| 16 | 42.99 | 21.33 | 0.00 | 9.44 | 0.00 | 2.26 | 1.23 | 5.11 | 2.83 | 7.66 | 0.00 | 0.00 | 0.00 | 0.00 |
| 17 | 42.99 | 21.33 | 0.00 | 9.43 | 0.00 | 3.30 | 1.80 | 7.47 | 2.83 | 4.15 | 0.00 | 0.00 | 0.00 | 0.00 |
| 18 | 43.14 | 21.27 | 0.00 | 9.41 | 0.00 | 3.29 | 1.80 | 7.45 | 2.82 | 4.14 | 0.00 | 0.00 | 0.00 | 0.00 |
| 19 | 43.14 | 21.27 | 0.00 | 9.41 | 0.00 | 1.60 | 3.49 | 7.45 | 2.82 | 4.14 | 0.00 | 0.00 | 0.00 | 0.00 |
| 20 | 43.14 | 21.27 | 0.00 | 9.41 | 0.00 | 1.60 | 1.80 | 9.15 | 2.82 | 4.14 | 0.00 | 0.00 | 0.00 | 0.00 |

| Example No. | Nb | W | Bi | Cu | Total (Cation %.) | $Sb_2O_3$ (mass %) | O | F | Total (Anion %.) |
|---|---|---|---|---|---|---|---|---|---|
| 1 | 0.00 | 0.00 | 0.00 | 7.04 | 100.00 | 0.000 | 100.00 | 0.00 | 100 |
| 2 | 0.00 | 0.00 | 0.00 | 7.04 | 100.00 | 0.000 | 100.00 | 0.00 | 100 |
| 3 | 0.00 | 0.00 | 0.00 | 6.90 | 100.00 | 0.000 | 100.00 | 0.00 | 100 |
| 4 | 0.00 | 0.00 | 0.00 | 7.04 | 100.00 | 0.000 | 100.00 | 0.00 | 100 |
| 5 | 0.00 | 0.00 | 0.00 | 7.04 | 100.00 | 0.000 | 100.00 | 0.00 | 100 |
| 6 | 0.00 | 0.00 | 0.00 | 6.75 | 100.00 | 0.000 | 100.00 | 0.00 | 100 |
| 7 | 0.00 | 0.00 | 0.00 | 6.59 | 100.00 | 0.000 | 100.00 | 0.00 | 100 |
| 8 | 0.00 | 0.00 | 0.00 | 6.42 | 100.00 | 0.000 | 100.00 | 0.00 | 100 |
| 9 | 0.00 | 0.00 | 0.00 | 6.23 | 100.00 | 0.000 | 100.00 | 0.00 | 100 |
| 10 | 0.00 | 0.00 | 0.00 | 6.90 | 100.00 | 0.000 | 100.00 | 0.00 | 100 |
| 11 | 0.00 | 0.00 | 0.00 | 6.85 | 100.00 | 0.000 | 100.00 | 0.00 | 100 |
| 12 | 0.00 | 0.00 | 0.00 | 6.85 | 100.00 | 0.000 | 100.00 | 0.00 | 100 |
| 13 | 0.00 | 0.00 | 0.00 | 6.85 | 100.00 | 0.000 | 100.00 | 0.00 | 100 |
| 14 | 0.00 | 0.00 | 0.00 | 6.22 | 100.00 | 0.000 | 100.00 | 0.00 | 100 |
| 15 | 0.00 | 0.00 | 0.00 | 6.53 | 100.00 | 0.000 | 100.00 | 0.00 | 100 |
| 16 | 0.00 | 0.00 | 0.00 | 7.15 | 100.00 | 0.000 | 100.00 | 0.00 | 100 |
| 17 | 0.00 | 0.00 | 0.00 | 6.70 | 100.00 | 0.000 | 100.00 | 0.00 | 100 |
| 18 | 0.00 | 0.00 | 0.00 | 6.68 | 100.00 | 0.000 | 100.00 | 0.00 | 100 |
| 19 | 0.00 | 0.00 | 0.00 | 6.68 | 100.00 | 0.000 | 100.00 | 0.00 | 100 |
| 20 | 0.00 | 0.00 | 0.00 | 6.68 | 100.00 | 0.000 | 100.00 | 0.00 | 100 |

TABLE 1-2

| Example No. | P | Li | Na | K | Mg | Ca | Sr | Ba | Al | Zn | Y | La | Ti | Zr |
|---|---|---|---|---|---|---|---|---|---|---|---|---|---|---|
| 20 | 43.14 | 21.27 | 0.00 | 9.41 | 0.00 | 1.60 | 1.80 | 9.15 | 2.82 | 4.14 | 0.00 | 0.00 | 0.00 | 0.00 |
| 21 | 42.99 | 21.33 | 0.00 | 9.44 | 0.00 | 2.26 | 1.23 | 5.11 | 2.83 | 8.40 | 0.00 | 0.00 | 0.00 | 0.00 |
| 22 | 43.46 | 21.15 | 0.00 | 9.35 | 0.00 | 3.27 | 1.79 | 7.41 | 2.81 | 4.51 | 0.00 | 0.00 | 0.00 | 0.00 |
| 23 | 43.46 | 21.15 | 0.00 | 9.35 | 0.00 | 4.76 | 0.30 | 7.41 | 2.81 | 4.51 | 0.00 | 0.00 | 0.00 | 0.00 |
| 24 | 43.46 | 21.15 | 0.00 | 9.35 | 0.00 | 4.76 | 1.79 | 5.9 | 2.81 | 4.51 | 0.00 | 0.00 | 0.00 | 0.00 |
| 25 | 42.88 | 22.93 | 0.00 | 10.13 | 0.00 | 3.99 | 1.51 | 4.95 | 3.05 | 3.79 | 0.00 | 0.00 | 0.00 | 0.00 |

TABLE 1-2-continued

| | | | | | | | | | | | | | | |
|---|---|---|---|---|---|---|---|---|---|---|---|---|---|---|
| 26 | 42.20 | 24.97 | 0.00 | 11.04 | 0.00 | 3.11 | 1.17 | 3.86 | 3.32 | 2.95 | 0.00 | 0.00 | 0.00 | 0.00 |
| 27 | 41.39 | 27.42 | 0.00 | 12.12 | 0.00 | 2.05 | 0.78 | 2.54 | 3.64 | 1.94 | 0.00 | 0.00 | 0.00 | 0.00 |
| 28 | 41.62 | 26.53 | 0.00 | 11.72 | 0.00 | 3.07 | 1.15 | 3.81 | 3.27 | 2.91 | 0.00 | 0.00 | 0.00 | 0.00 |
| 29 | 41.62 | 0.00 | 26.53 | 11.72 | 0.00 | 3.07 | 1.15 | 3.81 | 3.27 | 2.91 | 0.00 | 0.00 | 0.00 | 0.00 |
| 30 | 41.62 | 26.53 | 11.72 | 0.00 | 0.00 | 3.07 | 1.15 | 3.81 | 3.27 | 2.91 | 0.00 | 0.00 | 0.00 | 0.00 |
| 31 | 41.62 | 26.53 | 0.00 | 11.72 | 0.00 | 4.18 | 1.57 | 5.19 | 3.27 | 0.00 | 0.00 | 0.00 | 0.00 | 0.00 |
| 32 | 42.99 | 21.33 | 4.20 | 9.44 | 0.00 | 2.26 | 1.23 | 5.11 | 2.83 | 4.20 | 0.00 | 0.00 | 0.00 | 0.00 |
| 33 | 42.99 | 21.33 | 0.00 | 9.44 | 4.20 | 2.26 | 1.23 | 5.11 | 2.83 | 4.20 | 0.00 | 0.00 | 0.00 | 0.00 |
| 34 | 41.62 | 26.52 | 3.59 | 8.14 | 0.00 | 4.18 | 1.57 | 5.19 | 3.43 | 0.00 | 0.00 | 0.00 | 0.00 | 0.00 |
| 35 | 41.62 | 26.52 | 8.13 | 3.60 | 0.00 | 4.18 | 1.57 | 5.19 | 3.43 | 0.00 | 0.00 | 0.00 | 0.00 | 0.00 |
| 36 | 41.62 | 26.52 | 0.00 | 11.72 | 0.00 | 2.61 | 3.14 | 5.19 | 3.43 | 0.00 | 0.00 | 0.00 | 0.00 | 0.00 |
| 37 | 41.63 | 26.52 | 0.00 | 11.72 | 0.00 | 4.18 | 3.14 | 3.62 | 3.43 | 0.00 | 0.00 | 0.00 | 0.00 | 0.00 |
| 38 | 43.02 | 25.88 | 0.00 | 11.45 | 0.00 | 3.34 | 1.25 | 4.14 | 5.14 | 0.00 | 0.00 | 0.00 | 0.00 | 0.00 |
| 39 | 43.47 | 21.15 | 9.35 | 0.00 | 0.00 | 4.76 | 1.79 | 5.92 | 2.81 | 4.51 | 0.00 | 0.00 | 0.00 | 0.00 |
| 40 | 43.46 | 21.15 | 9.35 | 0.00 | 0.00 | 5.62 | 2.11 | 6.99 | 2.81 | 2.26 | 0.00 | 0.00 | 0.00 | 0.00 |

| Example No. | Nb | W | Bi | Cu | Total (Cation %.) | $Sb_2O_3$ (mass %) | O | F | Total (Anion %.) |
|---|---|---|---|---|---|---|---|---|---|
| 20 | 0.00 | 0.00 | 0.00 | 6.68 | 100.00 | 0.000 | 100.00 | 0.00 | 100 |
| 21 | 0.00 | 0.00 | 0.00 | 6.41 | 100.00 | 0.000 | 100.00 | 0.00 | 100 |
| 22 | 0.00 | 0.00 | 0.00 | 6.25 | 100.00 | 0.000 | 100.00 | 0.00 | 100 |
| 23 | 0.00 | 0.00 | 0.00 | 6.25 | 100.00 | 0.000 | 100.00 | 0.00 | 100 |
| 24 | 0.00 | 0.00 | 0.00 | 6.25 | 100.00 | 0.000 | 100.00 | 0.00 | 100 |
| 25 | 0.00 | 0.00 | 0.00 | 6.77 | 100.00 | 0.000 | 100.00 | 0.00 | 100 |
| 26 | 0.00 | 0.00 | 0.00 | 7.38 | 100.00 | 0.000 | 100.00 | 0.00 | 100 |
| 27 | 0.00 | 0.00 | 0.00 | 8.10 | 100.00 | 0.000 | 100.00 | 0.00 | 100 |
| 28 | 0.00 | 0.00 | 0.00 | 5.92 | 100.00 | 0.000 | 100.00 | 0.00 | 100 |
| 29 | 0.00 | 0.00 | 0.00 | 5.92 | 100.00 | 0.000 | 100.00 | 0.00 | 100 |
| 30 | 0.00 | 0.00 | 0.00 | 5.92 | 100.00 | 0.000 | 100.00 | 0.00 | 100 |
| 31 | 0.00 | 0.00 | 0.00 | 5.92 | 100.00 | 0.000 | 100.00 | 0.00 | 100 |
| 32 | 0.00 | 0.00 | 0.00 | 6.41 | 100.00 | 0.000 | 100.00 | 0.00 | 100 |
| 33 | 0.00 | 0.00 | 0.00 | 6.41 | 100.00 | 0.000 | 100.00 | 0.00 | 100 |
| 34 | 0.00 | 0.00 | 0.00 | 5.76 | 100.00 | 0.000 | 100.00 | 0.00 | 100 |
| 35 | 0.00 | 0.00 | 0.00 | 5.76 | 100.00 | 0.000 | 100.00 | 0.00 | 100 |
| 36 | 0.00 | 0.00 | 0.00 | 5.76 | 100.00 | 0.000 | 100.00 | 0.00 | 100 |
| 37 | 0.00 | 0.00 | 0.00 | 5.76 | 100.00 | 0.000 | 100.00 | 0.00 | 100 |
| 38 | 0.00 | 0.00 | 0.00 | 5.78 | 100.00 | 0.000 | 100.00 | 0.00 | 100 |
| 39 | 0.00 | 0.00 | 0.00 | 6.25 | 100.00 | 0.000 | 100.00 | 0.00 | 100 |
| 40 | 0.00 | 0.00 | 0.00 | 6.25 | 100.00 | 0.000 | 100.00 | 0.00 | 100 |

TABLE 1-3

| Example No. | P | Li | Na | K | Mg | Ca | Sr | Ba | Al | Zn | Y | La | Ti | Zr |
|---|---|---|---|---|---|---|---|---|---|---|---|---|---|---|
| 41 | 43.46 | 21.15 | 9.35 | 0.00 | 0.00 | 6.48 | 2.44 | 8.06 | 2.81 | 0.00 | 0.00 | 0.00 | 0.00 | 0.00 |
| 42 | 43.47 | 21.15 | 9.35 | 0.00 | 4.51 | 4.76 | 1.79 | 5.92 | 2.81 | 0.00 | 0.00 | 0.00 | 0.00 | 0.00 |
| 43 | 43.02 | 25.88 | 4.96 | 6.49 | 0.00 | 3.34 | 1.25 | 4.14 | 5.14 | 0.00 | 0.00 | 0.00 | 0.00 | 0.00 |
| 44 | 43.02 | 25.88 | 6.48 | 4.97 | 0.00 | 3.34 | 1.25 | 4.14 | 5.14 | 0.00 | 0.00 | 0.00 | 0.00 | 0.00 |
| 45 | 43.02 | 25.88 | 0.00 | 11.45 | 1.50 | 2.76 | 1.04 | 3.43 | 5.14 | 0.00 | 0.00 | 0.00 | 0.00 | 0.00 |
| 46 | 42.44 | 26.14 | 0.51 | 11.57 | 1.52 | 2.79 | 1.05 | 3.46 | 4.69 | 0.00 | 0.00 | 0.00 | 0.00 | 0.00 |
| 47 | 42.73 | 26.01 | 0.50 | 11.51 | 1.01 | 2.77 | 1.05 | 3.45 | 5.17 | 0.00 | 0.00 | 0.00 | 0.00 | 0.00 |
| 48 | 42.15 | 26.27 | 1.02 | 11.62 | 1.02 | 2.80 | 1.06 | 3.48 | 4.71 | 0.00 | 0.00 | 0.00 | 0.00 | 0.00 |
| 49 | 42.95 | 25.91 | 1.00 | 11.46 | 1.33 | 2.44 | 0.92 | 3.04 | 5.15 | 0.00 | 0.00 | 0.00 | 0.00 | 0.00 |
| 50 | 43.02 | 25.88 | 0.00 | 11.45 | 1.00 | 2.96 | 1.11 | 3.67 | 5.14 | 0.00 | 0.00 | 0.00 | 0.00 | 0.00 |
| 51 | 43.01 | 25.88 | 0.00 | 11.45 | 1.25 | 2.86 | 1.07 | 3.55 | 5.14 | 0.00 | 0.00 | 0.00 | 0.00 | 0.00 |
| 52 | 43.02 | 25.88 | 2.50 | 8.95 | 1.00 | 2.96 | 1.11 | 3.67 | 5.14 | 0.00 | 0.00 | 0.00 | 0.00 | 0.00 |
| 53 | 43.01 | 25.88 | 2.50 | 8.95 | 1.25 | 2.86 | 1.07 | 3.55 | 5.14 | 0.00 | 0.00 | 0.00 | 0.00 | 0.00 |
| 54 | 42.28 | 26.22 | 0.00 | 11.60 | 1.52 | 2.80 | 1.05 | 3.48 | 5.19 | 0.00 | 0.00 | 0.00 | 0.00 | 0.00 |
| 55 | 42.06 | 26.55 | 0.00 | 11.75 | 1.54 | 2.84 | 1.06 | 3.52 | 4.75 | 0.00 | 0.00 | 0.00 | 0.00 | 0.00 |
| 56 | 41.83 | 26.89 | 0.00 | 11.90 | 1.56 | 2.87 | 1.08 | 3.57 | 4.30 | 0.00 | 0.00 | 0.00 | 0.00 | 0.00 |
| 57 | 41.59 | 27.24 | 0.00 | 12.05 | 1.58 | 2.91 | 1.09 | 3.62 | 3.83 | 0.00 | 0.00 | 0.00 | 0.00 | 0.00 |
| 58 | 41.59 | 27.24 | 0.00 | 12.05 | 1.58 | 3.02 | 1.14 | 3.76 | 3.83 | 0.00 | 0.00 | 0.00 | 0.00 | 0.00 |
| 59 | 41.59 | 27.24 | 0.00 | 12.05 | 1.58 | 2.80 | 1.04 | 3.48 | 3.83 | 0.00 | 0.00 | 0.00 | 0.00 | 0.00 |
| 60 | 42.09 | 27.07 | 0.00 | 11.95 | 1.57 | 2.88 | 1.08 | 3.58 | 3.80 | 0.00 | 0.00 | 0.00 | 0.00 | 0.00 |

| Example No. | Nb | W | Bi | Cu | Total (Cation %.) | $Sb_2O_3$ (mass %) | O | F | Total (Anion %.) |
|---|---|---|---|---|---|---|---|---|---|
| 41 | 0.00 | 0.00 | 0.00 | 6.25 | 100.00 | 0.000 | 100.00 | 0.00 | 100 |
| 42 | 0.00 | 0.00 | 0.00 | 6.25 | 100.00 | 0.000 | 100.00 | 0.00 | 100 |
| 43 | 0.00 | 0.00 | 0.00 | 5.78 | 100.00 | 0.000 | 100.00 | 0.00 | 100 |
| 44 | 0.00 | 0.00 | 0.00 | 5.78 | 100.00 | 0.000 | 100.00 | 0.00 | 100 |
| 45 | 0.00 | 0.00 | 0.00 | 5.78 | 100.00 | 0.000 | 100.00 | 0.00 | 100 |
| 46 | 0.00 | 0.00 | 0.00 | 5.84 | 100.00 | 0.000 | 100.00 | 0.00 | 100 |
| 47 | 0.00 | 0.00 | 0.00 | 5.81 | 100.00 | 0.000 | 100.00 | 0.00 | 100 |

TABLE 1-3-continued

| | | | | | | | | | |
|---|---|---|---|---|---|---|---|---|---|
| 48 | 0.00 | 0.00 | 0.00 | 5.87 | 100.00 | 0.000 | 100.00 | 0.00 | 100 |
| 49 | 0.00 | 0.00 | 0.00 | 5.79 | 100.00 | 0.000 | 100.00 | 0.00 | 100 |
| 50 | 0.00 | 0.00 | 0.00 | 5.78 | 100.00 | 0.000 | 100.00 | 0.00 | 100 |
| 51 | 0.00 | 0.00 | 0.00 | 5.78 | 100.00 | 0.000 | 100.00 | 0.00 | 100 |
| 52 | 0.00 | 0.00 | 0.00 | 5.78 | 100.00 | 0.000 | 100.00 | 0.00 | 100 |
| 53 | 0.00 | 0.00 | 0.00 | 5.78 | 100.00 | 0.000 | 100.00 | 0.00 | 100 |
| 54 | 0.00 | 0.00 | 0.00 | 5.86 | 100.00 | 0.000 | 100.00 | 0.00 | 100 |
| 55 | 0.00 | 0.00 | 0.00 | 5.93 | 100.00 | 0.000 | 100.00 | 0.00 | 100 |
| 56 | 0.00 | 0.00 | 0.00 | 6.01 | 100.00 | 0.000 | 100.00 | 0.00 | 100 |
| 57 | 0.00 | 0.00 | 0.00 | 6.09 | 100.00 | 0.000 | 100.00 | 0.00 | 100 |
| 58 | 0.00 | 0.00 | 0.00 | 5.79 | 100.00 | 0.000 | 100.00 | 0.00 | 100 |
| 59 | 0.00 | 0.00 | 0.00 | 6.39 | 100.00 | 0.000 | 100.00 | 0.00 | 100 |
| 60 | 0.00 | 0.00 | 0.00 | 6.04 | 100.00 | 0.000 | 100.00 | 0.00 | 100 |

TABLE 1-4

| Example No. | P | Li | Na | K | Mg | Ca | Sr | Ba | Al | Zn | Y | La |
|---|---|---|---|---|---|---|---|---|---|---|---|---|
| 61 | 42.60 | 26.77 | 0.00 | 11.84 | 1.55 | 2.86 | 1.07 | 3.55 | 3.77 | 0.00 | 0.00 | 0.00 |
| 62 | 43.13 | 26.52 | 0.00 | 11.73 | 1.54 | 2.83 | 1.06 | 3.52 | 3.73 | 0.00 | 0.00 | 0.00 |
| 63 | 43.67 | 26.27 | 0.00 | 11.62 | 1.52 | 2.81 | 1.05 | 3.49 | 3.70 | 0.00 | 0.00 | 0.00 |
| 54 | 41.59 | 27.24 | 0.00 | 12.05 | 1.58 | 3.06 | 1.15 | 3.81 | 3.83 | 0.00 | 0.00 | 0.00 |
| 65 | 42.05 | 26.57 | 0.00 | 11.75 | 1.54 | 2.98 | 1.12 | 3.71 | 3.74 | 0.00 | 0.99 | 0.00 |
| 66 | 41.82 | 26.90 | 0.00 | 11.90 | 1.56 | 3.02 | 1.14 | 3.76 | 3.78 | 0.00 | 0.00 | 0.50 |
| 67 | 42.35 | 26.43 | 0.00 | 11.69 | 1.53 | 2.97 | 1.12 | 3.69 | 3.72 | 0.00 | 0.00 | 0.00 |
| 68 | 42.64 | 26.30 | 0.00 | 11.63 | 1.52 | 2.95 | 1.11 | 3.67 | 3.70 | 0.00 | 0.00 | 0.00 |
| 69 | 42.91 | 26.17 | 0.00 | 11.58 | 1.52 | 2.94 | 1.10 | 3.66 | 3.68 | 0.00 | 0.00 | 0.00 |
| 70 | 42.05 | 26.57 | 0.00 | 11.75 | 1.54 | 2.98 | 1.12 | 3.71 | 3.74 | 0.00 | 0.00 | 0.00 |
| 71 | 41.97 | 26.83 | 0.00 | 11.88 | 1.56 | 3.01 | 1.13 | 3.75 | 3.77 | 0.00 | 0.00 | 0.00 |
| 72 | 41.59 | 27.24 | 0.00 | 12.05 | 1.58 | 2.91 | 1.09 | 3.62 | 3.83 | 0.00 | 0.00 | 0.00 |

| Example No. | Ti | Zr | Nb | W | Bi | Cu | Total (Cation %.) | $Sb_2O_3$ (mass %) | O | F | Total (Anion %.) |
|---|---|---|---|---|---|---|---|---|---|---|---|
| 61 | 0.00 | 0.00 | 0.00 | 0.00 | 0.00 | 5.98 | 100.00 | 0.000 | 100.00 | 0.00 | 100 |
| 62 | 0.00 | 0.00 | 0.00 | 0.00 | 0.00 | 5.93 | 100.00 | 0.000 | 100.00 | 0.00 | 100 |
| 63 | 0.00 | 0.00 | 0.00 | 0.00 | 0.00 | 5.87 | 100.00 | 0.000 | 100.00 | 0.00 | 100 |
| 54 | 0.00 | 0.00 | 0.00 | 0.00 | 0.00 | 5.69 | 100.00 | 0.000 | 100.00 | 0.00 | 100 |
| 65 | 0.00 | 0.00 | 0.00 | 0.00 | 0.00 | 5.55 | 100.00 | 0.000 | 100.00 | 0.00 | 100 |
| 66 | 0.00 | 0.00 | 0.00 | 0.00 | 0.00 | 5.62 | 100.00 | 0.000 | 100.00 | 0.00 | 100 |
| 67 | 0.98 | 0.00 | 0.00 | 0.00 | 0.00 | 5.52 | 100.00 | 0.000 | 100.00 | 0.00 | 100 |
| 68 | 0.00 | 0.00 | 0.98 | 0.00 | 0.00 | 5.50 | 100.00 | 0.000 | 100.00 | 0.00 | 100 |
| 69 | 0.00 | 0.00 | 0.00 | 0.97 | 0.00 | 5.47 | 100.00 | 0.000 | 100.00 | 0.00 | 100 |
| 70 | 0.00 | 0.00 | 0.00 | 0.00 | 0.99 | 5.55 | 100.00 | 0.000 | 100.00 | 0.00 | 100 |
| 71 | 0.00 | 0.50 | 0.00 | 0.00 | 0.00 | 5.60 | 100.00 | 0.000 | 100.00 | 0.00 | 100 |
| 72 | 0.00 | 0.00 | 0.00 | 0.00 | 0.00 | 6.09 | 100.00 | 0.015 | 100.00 | 0.00 | 100 |

TABLE 1-5

| Example No. | P | Li | Na | K | Mg | Ca | Sr | Ba | Al | Zn | Y | La |
|---|---|---|---|---|---|---|---|---|---|---|---|---|
| 73 | 41.59 | 27.24 | 0.00 | 12.05 | 1.58 | 4.09 | 1.54 | 5.10 | 3.83 | 0.00 | 0.00 | 0.00 |
| 74 | 42.99 | 21.33 | 0.00 | 9.44 | 0.00 | 3.06 | 1.67 | 6.92 | 2.83 | 8.40 | 0.00 | 0.00 |
| 76 | 48.52 | 18.93 | 0.00 | 8.38 | 1.40 | 2.01 | 1.09 | 4.54 | 1.11 | 7.07 | 0.00 | 0.00 |
| 77 | 48.52 | 18.93 | 0.00 | 8.38 | 1.40 | 2.01 | 1.09 | 4.54 | 1.11 | 7.07 | 0.00 | 0.00 |
| 78 | 48.52 | 18.93 | 0.00 | 8.38 | 1.40 | 2.01 | 1.09 | 4.54 | 1.11 | 7.07 | 0.00 | 0.00 |
| 79 | 48.52 | 18.93 | 0.00 | 8.38 | 1.40 | 2.01 | 1.09 | 4.54 | 1.11 | 7.07 | 0.00 | 0.88 |
| 80 | 48.52 | 18.93 | 0.00 | 8.38 | 1.40 | 2.01 | 1.09 | 4.54 | 1.11 | 7.07 | 0.88 | 0.00 |
| 81 | 48.92 | 18.47 | 0.00 | 8.17 | 1.37 | 1.96 | 1.07 | 4.42 | 1.08 | 6.90 | 0.00 | 0.00 |

| Example No. | Ti | Zr | Nb | W | Bi | Cu | Total (Cation %.) | $Sb_2O_3$ (mass %) | O | F | Total (Anion %.) |
|---|---|---|---|---|---|---|---|---|---|---|---|
| 73 | 0.00 | 0.00 | 0.00 | 0.00 | 0.00 | 2.98 | 100.00 | 0.00 | 100.00 | 0.00 | 100 |
| 74 | 0.00 | 0.00 | 0.00 | 0.00 | 0.00 | 3.36 | 100.00 | 0.00 | 100.00 | 0.00 | 100 |
| 76 | 0.00 | 0.00 | 0.88 | 0.00 | 0.00 | 6.08 | 100.00 | 0.00 | 100.00 | 0.00 | 100 |
| 77 | 0.00 | 0.00 | 0.00 | 0.00 | 0.88 | 6.08 | 100.00 | 0.00 | 100.00 | 0.00 | 100 |
| 78 | 0.88 | 0.00 | 0.00 | 0.00 | 0.00 | 6.08 | 100.00 | 0.00 | 100.00 | 0.00 | 100 |
| 79 | 0.00 | 0.00 | 0.00 | 0.00 | 0.00 | 6.08 | 100.00 | 0.00 | 100.00 | 0.00 | 100 |
| 80 | 0.00 | 0.00 | 0.00 | 0.00 | 0.00 | 6.08 | 100.00 | 0.00 | 100.00 | 0.00 | 100 |
| 81 | 0.00 | 0.00 | 0.00 | 0.00 | 1.72 | 5.93 | 100.00 | 0.00 | 100.00 | 0.00 | 100 |

TABLE 1-6

| Example No. | P | Li | Na | K | Mg | Ca | Sr | Ba | Al | Zn | Y | Ln | Ti | Zr | Nb | W |
|---|---|---|---|---|---|---|---|---|---|---|---|---|---|---|---|---|
| Comp.Ex.A | 45.95 | 27.66 | 6.59 | 3.91 | 3.09 | 2.93 | 1.15 | 0.00 | 6.54 | 0.00 | 0.00 | 0.00 | 0.00 | 0.00 | 0.00 | 0.00 |
| Comp.Ex.B | 42.08 | 0.00 | 13.77 | 13.53 | 14.36 | 3.54 | 0.96 | 1.75 | 5.16 | 0.00 | 0.00 | 0.00 | 0.00 | 0.00 | 0.00 | 0.00 |
| Comp.Ex.C | 45.61 | 0.00 | 0.00 | 20.77 | 4.36 | 4.39 | 0.00 | 9.18 | 8.97 | 0.00 | 0.00 | 0.00 | 0.00 | 0.00 | 0.00 | 0.00 |
| Comp.Ex.D | 54.36 | 26.78 | 0.00 | 0.00 | 0.00 | 0.00 | 0.00 | 0.00 | 7.10 | 0.58 | 0.00 | 0.00 | 0.00 | 0.00 | 0.00 | 0.00 |
| Comp.Ex.E | 53.76 | 20.77 | 5.71 | 0.00 | 0.00 | 0.00 | 0.00 | 0.00 | 7.02 | 1.53 | 0.00 | 0.00 | 0.00 | 0.00 | 0.00 | 0.00 |
| Comp.Ex.F | 52.82 | 21.19 | 5.83 | 0.00 | 0.00 | 0.00 | 0.00 | 0.00 | 7.17 | 1.56 | 0.00 | 0.00 | 0.00 | 0.00 | 0.00 | 0.00 |

| Example No. | Bi | Cu | Total (cation %) | $Sb_2O_3$ (mass %) | O | F | Total (Anion %.) |
|---|---|---|---|---|---|---|---|
| Comp.Ex.A | 0.00 | 2.19 | 100.00 | 0.00 | 100.00 | 0.00 | 100 |
| Comp.Ex.B | 0.00 | 4.85 | 100.00 | 0.00 | 100.00 | 0.00 | 100 |
| Comp.Ex.C | 0.00 | 6.72 | 100.00 | 0.00 | 100.00 | 0.00 | 100 |
| Comp.Ex.D | 0.00 | 11.18 | 100.00 | 0.00 | 100.00 | 0.00 | 100 |
| Comp.Ex.E | 0.00 | 11.20 | 100.00 | 0.00 | 100.00 | 0.00 | 100 |
| Comp.Ex.F | 0.00 | 11.43 | 100.00 | 0.00 | 100.00 | 0.00 | 100 |

TABLE 2-1

| Example No. | Li + Na + K | Mg + Ca + Sr + Ba | Al + P | (Al + P)/(Mg + Ca + Sr + Ba + Zn + Cu) | (Mg + Ca + Sr + Ba)/(Li + Na + K) | Average valence excluding P and Cu | Average valence including Cu and excluding P | O/P | Zn/(Mg + Ca + S + Ba + Zn) |
|---|---|---|---|---|---|---|---|---|---|
| 1 | 31.64 | 10.47 | 42.66 | 1.660 | 0.331 | 1.411 | 1.482 | 3.550 | 0.439 |
| 2 | 31.64 | 10.47 | 42.66 | 1.660 | 0.331 | 1.411 | 1.482 | 3.550 | 0.439 |
| 3 | 31.01 | 10.26 | 43.79 | 1.738 | 0.331 | 1.412 | 1.482 | 3.501 | 0.439 |
| 3 | 31.64 | 10.047 | 42.66 | 1.660 | 0.331 | 1.411 | 1.482 | 3.550 | 0.439 |
| 5 | 31.64 | 10.47 | 42.66 | 1.660 | 0.331 | 1.411 | 1.482 | 3.550 | 0.439 |
| 6 | 30.33 | 10.03 | 45.04 | 1.828 | 0.331 | 1.412 | 1.482 | 3.451 | 0.439 |
| 7 | 29.60 | 9.79 | 46.35 | 1.927 | 0.331 | 1.412 | 1.482 | 3.401 | 0.439 |
| 8 | 28.33 | 9.54 | 47.76 | 2.039 | 0.331 | 1.412 | 1.482 | 3.350 | 0.439 |
| 9 | 28.02 | 9.27 | 49.23 | 2.163 | 0.331 | 1.412 | 1.482 | 3.300 | 0.439 |
| 10 | 31.01 | 10.26 | 43.79 | 1.738 | 0.331 | 1.412 | 1.482 | 3.501 | 0.439 |
| 11 | 30.77 | 8.60 | 45.82 | 1.957 | 0.280 | 1.443 | 1.510 | 3 501 | 0.481 |
| 12 | 30.76 | 12.57 | 45.82 | 1.957 | 0.409 | 1.443 | 1.510 | 3.501 | 0.241 |
| 13 | 30.77 | 16.57 | 45.81 | 1.956 | 0.539 | 1.443 | 1.510 | 3.501 | 0.000 |
| 14 | 30.77 | 8.60 | 45.82 | 1.957 | 0.279 | 1.450 | 1.510 | 3.501 | 0.500 |
| 15 | 30.77 | 8.60 | 45.82 | 1.957 | 0.279 | 1.447 | 1.510 | 3.501 | 0.491 |
| 16 | 30.77 | 8.50 | 45.82 | 1.957 | 0.279 | 1.440 | 1.510 | 3.501 | 0.471 |
| 17 | 30.76 | 12.57 | 45.82 | 1.956 | 0.409 | 1.445 | 1.510 | 3.501 | 0.248 |
| 18 | 30.68 | 12.54 | 45.96 | 1.968 | 0.409 | 1.445 | 1.510 | 3.455 | 0.248 |
| 19 | 30.68 | 12.54 | 45.96 | 1.968 | 0.409 | 1.445 | 1.510 | 3.499 | 0.248 |
| 20 | 30.68 | 12.54 | 45.96 | 1.988 | 0.409 | 1.445 | 1.510 | 3.495 | 0.248 |

TABLE 2-2

| Example No. | Li + Na + K | Mg + Ca + Sr + Ba | Al + P | (Al + P)/(Mg + Ca + Sr + Ba + Zn + Cu) | (Mg + Ca + Sr + Ba)/(Li + Na + K) | Average valence excluding P and Cu | Average valence including Cu and excluding P | O/P | Zn/(Mg + Ca + S + Ba + Zn) |
|---|---|---|---|---|---|---|---|---|---|
| 21 | 30.77 | 8.60 | 45.82 | 1.957 | 0.279 | 1.448 | 1.510 | 3.501 | 0.494 |
| 22 | 30.51 | 12.47 | 46.26 | 1.992 | 0.409 | 1.449 | 1.510 | 3.482 | 0.266 |
| 23 | 30.51 | 12 47 | 46.26 | 1.992 | 0.409 | 1.449 | 1.510 | 3.482 | 0.266 |
| 24 | 30.50 | 12.47 | 46.27 | 1.992 | 0.409 | 1.449 | 1.510 | 3.482 | 0.266 |
| 25 | 33.06 | 10.45 | 45.92 | 2.185 | 0.316 | 1.404 | 1.475 | 3.482 | 0.266 |
| 26 | 36.01 | 8.14 | 45.52 | 2.465 | 0.228 | 1.352 | 1.434 | 3.482 | 0.266 |
| 27 | 39.55 | 5.37 | 45.04 | 2.921 | 0.316 | 1.289 | 1.387 | 3.482 | 0.266 |
| 28 | 38.25 | 8.03 | 43.90 | 2.664 | 0.210 | 1.333 | 1.401 | 3.482 | 0.266 |
| 29 | 38.25 | 8.03 | 44.90 | 2.664 | 0.210 | 1.333 | 1.401 | 3.482 | 0.266 |
| 30 | 38.25 | 8.03 | 44.90 | 2.664 | 0.210 | 1.333 | 1.401 | 3.482 | 0.266 |
| 31 | 38.25 | 10.94 | 44.90 | 2.664 | 0.286 | 1.333 | 1.401 | 3.482 | 0.000 |
| 32 | 34.97 | 8.60 | 45.82 | 2.385 | 0.246 | 1.365 | 1.436 | 3.452 | 0.328 |
| 33 | 30.77 | 12.80 | 45.82 | 1.957 | 0.416 | 1.448 | 1.510 | 3.501 | 0.247 |
| 34 | 38.25 | 10.93 | 45.06 | 2.699 | 0.286 | 1.338 | 1.404 | 3.484 | 0.000 |
| 35 | 38.25 | 10.93 | 45.06 | 2.699 | 0.286 | 1.338 | 1.404 | 3.484 | 0.000 |
| 36 | 38.25 | 10.94 | 45.05 | 2.699 | 0.286 | 1.338 | 1.404 | 3.484 | 0.000 |
| 37 | 38.25 | 10.94 | 45.06 | 2.699 | 0.286 | 1.338 | 1.404 | 3.484 | 0.000 |
| 38 | 37.33 | 8.73 | 48.17 | 3.321 | 0.234 | 1.371 | 1.435 | 3.450 | 0.000 |
| 39 | 30.50 | 12.47 | 46.26 | 1.992 | 0.409 | 1.449 | 1.510 | 3.484 | 0.266 |
| 40 | 30.50 | 14.72 | 46.27 | 1.992 | 0.483 | 1.449 | 1.510 | 3.482 | 0.133 |

TABLE 2-3

| Example No. | Li + Na + K | Mg + Ca + Sr + Ba | Al + P | (Al + P)/ (Mg + Ca + Sr + Ba + Zn + Cu) | (Mg + Ca + Sr + Ba)/ (Li + Na + K) | Average valence excluding P and Cu | Average valence including Cu and excluding P | O/P | Zn/ (Mg + Ca + S + Ba + Zn) |
|---|---|---|---|---|---|---|---|---|---|
| 41 | 30.50 | 16.98 | 46.27 | 1.992 | 0.557 | 1.449 | 1.510 | 3.482 | 0.000 |
| 42 | 30.50 | 16.98 | 46.28 | 1.992 | 0.557 | 1.449 | 1.510 | 3.482 | 0.000 |
| 43 | 37.33 | 8.73 | 48.16 | 3.319 | 0.234 | 1.371 | 1.435 | 3.450 | 0.000 |
| 44 | 37.33 | 8.73 | 48.16 | 3.319 | 0.234 | 1.371 | 1.435 | 3.450 | 0.000 |
| 45 | 37.33 | 8.73 | 48.16 | 3.319 | 0.234 | 1.371 | 1.435 | 3.450 | 0.000 |
| 46 | 38.21 | 8.82 | 47.13 | 3.216 | 0.231 | 1.352 | 1.418 | 3.461 | 0.000 |
| 47 | 38.02 | 8.27 | 47.90 | 3.402 | 0.218 | 1.362 | 1.426 | 3.456 | 0.000 |
| 48 | 38.91 | 8.36 | 46.86 | 3.295 | 0.215 | 1.342 | 1.409 | 3.467 | 0.000 |
| 49 | 38.38 | 7.74 | 48.10 | 3.556 | 0.202 | 1.352 | 1.418 | 3.441 | 0.000 |
| 50 | 37.32 | 8.74 | 48.16 | 3.317 | 0.234 | 1.871 | 1.435 | 3.450 | 0.000 |
| 51 | 37.34 | 8.73 | 46.15 | 3.318 | 0.334 | 1.371 | 1.435 | 3.451 | 0.000 |
| 52 | 37.32 | 8.74 | 48.16 | 3.317 | 0.234 | 1.371 | 1.435 | 3.450 | 0.000 |
| 53 | 37.34 | 8.73 | 48.15 | 3.318 | 0.234 | 1.371 | 1.435 | 3.451 | 0.000 |
| 54 | 37.82 | 8.85 | 47.47 | 3.227 | 0.234 | 1.371 | 1.435 | 3.479 | 0.000 |
| 55 | 38.30 | 8.98 | 46.81 | 3.142 | 0.234 | 1.355 | 1.421 | 3.479 | 0.000 |
| 56 | 39.79 | 9.08 | 46.12 | 3.657 | 0.234 | 1.339 | 1.407 | 3.479 | 0.000 |
| 57 | 39.29 | 9.19 | 45.42 | 2.972 | 0.234 | 1.322 | 1.393 | 3.478 | 0.000 |
| 58 | 39.29 | 9.49 | 45.42 | 2.972 | 0.242 | 1.326 | 1.393 | 3.478 | 0.000 |
| 59 | 39.29 | 8.90 | 45.42 | 2.971 | 0.226 | 1.318 | 1.393 | 3.478 | 0.000 |
| 60 | 38.96 | 9.12 | 45.89 | 3.028 | 0.234 | 1.322 | 1.393 | 3.458 | 0.000 |

TABLE 2-4

| Example No. | Li + Na + K | Mg + Ca + Sr + Ba | Al + P | (Al + P)/ (Mg + Ca + Sr + Ba + Zn + Cu) | (Mg + Ca + Sr + Ba)/ (Li + Na + K) | Average valence excluding P and Cu | Average valence including Cu and excluding P | O/P | Zn/ (Mg + Ca + S + Ba + Zn) |
|---|---|---|---|---|---|---|---|---|---|
| 61 | 36.61 | 9.04 | 46.37 | 3.087 | 0.234 | 1.322 | 1.393 | 3.438 | 0.000 |
| 62 | 36.26 | 8.95 | 46.86 | 3.149 | 0.234 | 1.322 | 1.393 | 3.418 | 0.000 |
| 63 | 37.89 | 8.87 | 47.37 | 3.214 | 0.234 | 1.322 | 1.393 | 3.398 | 0.000 |
| 64 | 39.29 | 9.00 | 45.42 | 2.972 | 0.244 | 1.327 | 1.393 | 3.478 | 0.000 |
| 65 | 38.32 | 9.35 | 45.79 | 3.073 | 0.244 | 1.359 | 1.420 | 3.479 | 0.000 |
| 66 | 38.80 | 9.48 | 45.60 | 3.020 | 0.244 | 1.343 | 1.407 | 3.478 | 0.000 |
| 67 | 38.12 | 9.31 | 46.07 | 3.107 | 0.244 | 1.378 | 1.437 | 3.478 | 0.000 |
| 68 | 37.33 | 9.25 | 48.34 | 3.142 | 0.244 | 1.397 | 1.454 | 3.478 | 0.000 |
| 69 | 37.75 | 9.22 | 46.59 | 3.172 | 0.244 | 1.415 | 1.471 | 3.479 | 0.000 |
| 70 | 38.32 | 9.35 | 45.79 | 3.073 | 0.244 | 1.359 | 1.420 | 3.479 | 0.000 |
| 71 | 38.71 | 9.45 | 45.74 | 3.039 | 0.244 | 1.353 | 1.415 | 3.478 | 0.000 |
| 72 | 39.29 | 9.20 | 45.42 | 2.971 | 0.244 | 1.322 | 1.393 | 3.478 | 0.000 |

TABLE 2-5

| Example No. | Li + Na + K | Mg + Ca + Sr + Ba | Al + P | (Al + P)/ (Mg + Ca + Sr + Ba + Zn + Cu) | (Mg + Ca + Sr + Ba)/ (Li + Na + K) | Average valence excluding P and Cu | Average valence including Cu and excluding P | O/P | Zn/ (Mg + Ca + S + Ba + Zn) |
|---|---|---|---|---|---|---|---|---|---|
| 73 | 39.29 | 12.31 | 45.42 | 2.971 | 0.313 | 1.360 | 1.393 | 3.478 | 0.000 |
| 74 | 30.77 | 11.65 | 45.82 | 1.957 | 0.379 | 1.479 | 1.510 | 3.501 | 0.419 |
| 75 | 27.31 | 9.04 | 49.63 | 2.237 | 0.331 | 1.481 | 1.542 | 3.318 | 0.439 |
| 77 | 27.31 | 9.04 | 49.63 | 2.237 | 0.331 | 1.442 | 1.508 | 3.300 | 0.439 |
| 78 | 27.31 | 9.04 | 49.63 | 2.237 | 0.331 | 1.462 | 1.525 | 3.309 | 0.439 |
| 79 | 27.31 | 9.04 | 49.62 | 2.237 | 0.331 | 1.442 | 1.508 | 3.300 | 0.439 |
| 80 | 27.31 | 9.04 | 49.63 | 2.237 | 0.331 | 1.442 | 1.508 | 3.300 | 0.439 |
| 81 | 28.84 | 8.81 | 50.00 | 2.311 | 0.331 | 1.472 | 1.533 | 3.301 | 0.439 |

TABLE 2-6

| Example No. | Li + Na + K | Mg + Ca + Sr + Ba | Al + P | (Al + P)/ (Mg + Ca + Sr + Ba + Zn + Cu) | (Mg + Ca + Sr + Ba)/ (Li + Na + K) | Average valence excluding P and Cu | Average valence including Cu and excluding P | O/P | Zn/ (Mg + Ca + S + Ba + Zn) |
|---|---|---|---|---|---|---|---|---|---|
| Comp.Ex.A | 38.16 | 7.17 | 52.48 | 5.607 | 0.188 | 1.390 | 1.415 | 3.333 | 0.000 |
| Comp.Ex.B | 22.30 | 20.61 | 47.24 | 1.855 | 0.755 | 1.583 | 1.618 | 3.613 | 0.000 |
| Comp.Ex.C | 20.77 | 17.93 | 54.58 | 2.214 | 0.863 | 1.752 | 1.783 | 3.563 | 0.000 |
| Comp.Ex.D | 26.78 | 0.00 | 61.46 | 5.227 | 0.000 | 1.429 | 1.569 | 3.159 | 1.000 |
| Comp.Ex.E | 26.48 | 0.00 | 60.79 | 4.776 | 0.000 | 1.445 | 1.579 | 3.161 | 1.000 |
| Comp.Ex.F | 27.02 | 0.00 | 59.99 | 4.618 | 0.000 | 1.445 | 1.579 | 3.187 | 1.000 |

TABLE 3-1

| Example No. | Thickness × Cu concentration (mol/m²) | Tg | Tm | Specific gravity | λ_T50 (nm) on 0.11 mm thickness basis | T1200 (%) on 0.11 mm thickness basis | T400 (%) on 0.11 mm thickness basis | λ_T50 (nm) on 0.21 mm thickness basis | T1200 (%) on 0.21 mm thickness basis | T400 (%) on 0.21 mm thickness basis | Meltability (1000° C. 60 min.) | Weatherabilty (1 week, 85° C. 85% RH) |
|---|---|---|---|---|---|---|---|---|---|---|---|---|
| 1 | 0.4062 | 359 | 777 | 3.22 | 621 | 26.50 | 79.63 | | | | ○ | ◎ |
| 2 | 0.4019 | 353 | 785 | 3.29 | 623 | 27.96 | 74.47 | | | | ○ | ◎ |
| 3 | 0.3947 | 356 | 794 | 3.21 | 627 | 26.03 | 77.13 | | | | ○ | ◎ |
| 4 | 0.4061 | 361 | 773 | 3.22 | 623 | 27.65 | 74.59 | | | | ○ | ◎ |
| 5 | 0.4065 | 357 | 781 | 3.23 | 627 | 30.82 | 76.21 | | | | ○ | ◎ |
| 6 | 0.3320 | 353 | 803 | 3.18 | 635 | 30.30 | 80.40 | | | | ○ | ○ |
| 7 | 0.3683 | 350 | 809 | 3.16 | 639 | 31.60 | 82.70 | | | | ○ | ○ |
| 8 | 0.3537 | 346 | 809 | 3.12 | 645 | 34.10 | 84.30 | | | | ○ | ○ |
| 9 | 0.3338 | 342 | 807 | 3.09 | 649 | 35.50 | 85.00 | | | | ○ | ○ |
| 10 | 0.3866 | 342 | 787 | 3.21 | 626 | 27.40 | 77.30 | | | | ○ | ◎ |
| 11 | 0.3896 | 360 | 794 | 3.20 | 630 | 30.20 | 78.30 | | | | ○ | ◎ |
| 12 | 0.3850 | 375 | 801 | 3.24 | 632 | 29.70 | 79.20 | | | | ○ | ◎ |
| 13 | 0.3804 | 389 | 794 | 3.28 | 630 | 27.30 | 76.10 | | | | ○ | ◎ |
| 14 | 0.3535 | 356 | 785 | 3.20 | 635 | 33.00 | 80.20 | | | | ○ | ◎ |
| 15 | 0.3712 | 359 | 796 | 3.20 | 632 | 30.70 | 79.30 | | | | ○ | ◎ |
| 16 | 0.4068 | 360 | 795 | 3.20 | 627 | 27.60 | 76.60 | | | | ○ | ◎ |
| 17 | 0.3765 | 373 | 797 | 3.24 | 630 | 29.40 | 78.10 | | | | ○ | ◎ |
| 18 | 0.3752 | 373 | 801 | 3.24 | 631 | 29.30 | 78.60 | | | | ○ | ○ |
| 19 | 0.3745 | 377 | 807 | 3.28 | 630 | 28.30 | 78.70 | | | | ○ | ○ |
| 20 | 0.3728 | 375 | 816 | 3.30 | 633 | 29.70 | 78.80 | | | | ○ | ○ |

TABLE 3-2

| Example No. | Thickness × Cu concentration (mol/m²) | Tg | Tm | Specific gravity | λ_T50 (nm) on 0.11 mm thickness basis | T1200 (%) on 0.11 mm thickness basis | T400 (%) on 0.11 mm thickness basis | λ_T50 (nm) on 0.21 mm thickness basis | T1200 (%) on 0.21 mm thickness basis | T400 (%) on 0.21 mm thickness basis | Meltability (1000° C. 60 min.) | Weatherabilty (1 week, 85° C. 85% RH) |
|---|---|---|---|---|---|---|---|---|---|---|---|---|
| 21 | 0.3647 | 358 | 788 | 3.20 | 633 | 31.55 | 85.34 | | | | ○ | ◎ |
| 22 | 0.3500 | 371 | 797 | 3.24 | 636 | 31.35 | 81.71 | | | | ○ | ○ |
| 23 | 0.3504 | 370 | 797 | 3.20 | 633 | 30.70 | 80.54 | | | | ○ | ○ |
| 24 | 0.3517 | 369 | 782 | 3.18 | 633 | 30.78 | 80.84 | | | | ○ | ○ |
| 25 | 0.3875 | 366 | 765 | 3.12 | 629 | 27.27 | 82.09 | | | | ○ | ○ |
| 26 | 0.4294 | 358 | 762 | 3.05 | 623 | 22.54 | 80.71 | | | | ○ | ○ |
| 27 | 0.4814 | 356 | — | 2.97 | 617 | 19.12 | 78.28 | | | | ○ | ○ |
| 28 | 0.3461 | 357 | 721 | 3.01 | 630 | 29.11 | 84.07 | | | | ○ | ○ |
| 29 | 0.3245 | 345 | — | 3.03 | 631 | 27.75 | 82.56 | | | | ○ | ○ |
| 30 | 0.3568 | 342 | 740 | 3.08 | 634 | 32.59 | 84.64 | | | | ○ | ○ |
| 31 | 0.3436 | 369 | 740 | 3.03 | 631 | 28.18 | 84.46 | | | | ○ | ○ |
| 32 | 0.3673 | 341 | 775 | 3.11 | 637 | 30.20 | 81.41 | | | | ○ | ○ |
| 33 | 0.3666 | 367 | 806 | 3.13 | 634 | 29.47 | 80.55 | | | | ○ | ◎ |
| 34 | 0.3405 | 380 | 736 | 3.05 | 635 | 3.055 | 84.54 | | | | ○ | ○ |
| 35 | 0.3478 | 354 | 736 | 3.07 | 637 | 32.05 | 84.04 | | | | ○ | ○ |
| 36 | 0.3335 | 370 | 735 | 3.05 | 632 | 28.93 | 84.13 | | | | ○ | ○ |
| 37 | 0.3355 | 370 | 725 | 2.99 | 633 | 29.71 | 84.63 | | | | ○ | ○ |
| 38 | 0.3343 | 377 | 785 | 2.97 | 637 | 30.20 | 83.26 | | | | ○ | ○ |
| 39 | 0.3683 | 359 | 811 | 3.25 | 636 | 33.29 | 82.32 | | | | ○ | ○ |
| 40 | 0.3658 | 366 | 812 | 3.26 | 636 | 32.54 | 82.09 | | | | ○ | ○ |

TABLE 3-3

| Example No. | Thickness × Cu concentration (mol/m²) | Tg | Tm | Specific gravity | λ_T50 (nm) on 0.11 mm thickness basis | T1200 (%) on 0.11 mm thickness basis | T400 (%) on 0.11 mm thickness basis | λ_T50 (nm) on 0.21 mm thickness basis | T1200 (%) on 0.21 mm thickness basis | T400 (%) on 0.21 mm thickness basis | Meltability (1000° C. 60 min.) | Weatherabilty (1 week, 85° C. 85% RH) |
|---|---|---|---|---|---|---|---|---|---|---|---|---|
| 41 | 0.3630 | 376 | 793 | 3.26 | 635 | 31.30 | 80.91 | | | | ○ | ○ |
| 42 | 0.3711 | 334 | 798 | 3.17 | 632 | 30.75 | 81.07 | | | | ○ | ○ |
| 43 | 0.3427 | 366 | 803 | 3.00 | 637 | 31.19 | 83.63 | | | | ○ | ○ |
| 44 | 0.3454 | 363 | 749 | 3.01 | 636 | 30.16 | 83.32 | | | | ○ | ○ |
| 45 | 0.3372 | 382 | 772 | 2.94 | 634 | 29.97 | 82.60 | | | | ○ | ○ |
| 46 | 0.3424 | 378 | 797 | 2.95 | 635 | 30.24 | 82.79 | | | | ○ | ○ |
| 47 | 0.3396 | 378 | 810 | 2.94 | 635 | 29.49 | 82.88 | | | | ○ | ○ |
| 48 | 0.3447 | 373 | 787 | 2.94 | 633 | 29.54 | 82.37 | | | | ○ | ○ |

TABLE 3-3-continued

| Example No. | Thickness × Cu concentration (mol/m²) | Tg | Tm | Specific gravity | λ_{T50} (nm) on 0.11 mm thickness basis | T1200 (%) on 0.11 mm thickness basis | T400 (%) on 0.11 mm thickness basis | λ_{T50} (nm) on 0.21 mm thickness basis | T1200 (%) on 0.21 mm thickness basis | T400 (%) on 0.21 mm thickness basis | Meltability (1000° C. 60 min.) | Weatherabilty (1 week, 85° C. 85% RH) |
|---|---|---|---|---|---|---|---|---|---|---|---|---|
| 49 | 0.3447 | 374 | 789 | 2.92 | 636 | 30.70 | 83.75 | | | | ○ | ○ |
| 50 | 0.3364 | 382 | 783 | 2.96 | 636 | 29.56 | 83.36 | | | | ○ | ○ |
| 51 | 0.3369 | 381 | 735 | 2.95 | 636 | 29.90 | 83.46 | | | | ○ | ○ |
| 52 | 0.3404 | 374 | 766 | 2.97 | 635 | 30.21 | 82.80 | | | | ○ | ○ |
| 53 | 0.3409 | 372 | 761 | 2.95 | 633 | 29.35 | 82.77 | | | | ○ | ○ |
| 54 | 0.3437 | 382 | 772 | 2.95 | 632 | 28.67 | 81.89 | | | | ○ | ○ |
| 55 | 0.3488 | 379 | 762 | 2.95 | 630 | 27.68 | 81.82 | | | | ○ | ○ |
| 56 | 0.3537 | 375 | 750 | 2.95 | 630 | 28.36 | 81.01 | | | | ○ | ○ |
| 57 | 0.3591 | 372 | 735 | 2.95 | 629 | 27.30 | 85.38 | | | | ○ | ○ |
| 58 | 0.3413 | 374 | 744 | 2.95 | 632 | 28.92 | 86.14 | | | | ○ | ○ |
| 59 | 0.3773 | 377 | 740 | 2.95 | 626 | 25.63 | 84.75 | | | | ○ | ○ |
| 60 | 0.3547 | 370 | 753 | 2.95 | 633 | 27.89 | 86.52 | | | | ○ | ○ |

TABLE 3-4

| Example No. | Thickness × Cu concentration (mol/m²) | Tg | Tm | Specific gravity | λ_{T50} (nm) on 0.11 mm thickness basis | T1200 (%) on 0.11 mm thickness basis | T400 (%) on 0.11 mm thickness basis | λ_{T50} (nm) on 0.21 mm thickness basis | T1200 (%) on 0.21 mm thickness basis | T400 (%) on 0.21 mm thickness basis | Meltability (1000° C. 60 min.) | Weatherabilty (1 week, 85° C. 85% RH) |
|---|---|---|---|---|---|---|---|---|---|---|---|---|
| 61 | 0.3500 | 368 | 746 | 2.94 | 635 | 28.38 | 87.17 | | | | ○ | ○ |
| 62 | 0.3450 | 365 | 759 | 2.93 | 636 | 29.21 | 87.53 | | | | ○ | ○ |
| 63 | 0.3398 | 362 | 766 | 2.92 | 636 | 29.12 | 87.82 | | | | ○ | ○ |
| 64 | 0.3360 | 372 | 729 | 2.95 | 633 | 28.66 | 86.59 | | | | ○ | ○ |
| 65 | 0.3240 | 375 | 731 | 2.97 | 637 | 31.42 | 83.34 | | | | ○ | ○ |
| 66 | 0.3291 | 374 | 749 | 2.97 | 634 | 30.52 | 82.45 | | | | ○ | ○ |
| 67 | 0.3213 | 376 | 739 | 2.95 | 637 | 31.28 | 76.26 | | | | ○ | ○ |
| 68 | 0.3177 | 371 | 754 | 2.96 | 636 | 31.40 | 81.81 | | | | ○ | ○ |
| 69 | 0.3146 | 369 | 757 | 3.00 | 641 | 32.82 | 77.14 | | | | ○ | ○ |
| 70 | 0.3236 | 371 | 741 | 3.03 | 635 | 30.59 | 81.52 | | | | ○ | ○ |
| 71 | 0.3266 | 371 | 762 | 2.95 | 629 | 28.81 | 75.40 | | | | ○ | ○ |
| 72 | 0.3590 | 371 | 731 | 2.95 | 631 | 27.50 | 81.18 | | | | ○ | ○ |

TABLE 3-5

| Example No. | Thickness × Cu concentration (mol/m²) | Tg | Tm | Specific gravity | λ_{T50} (nm) on 0.11 mm thickness basis | T1200 (%) on 0.11 mm thickness basis | T400 (%) on 0.11 mm thickness basis | λ_{T50} (nm) on 0.21 mm thickness basis | T1200 (%) on 0.21 mm thickness basis | T400 (%) on 0.21 mm thickness basis | Meltability (1000° C. 60 min.) | Weatherabilty (1 week, 85° C. 85% RH) |
|---|---|---|---|---|---|---|---|---|---|---|---|---|
| 73 | 0.3302 | 377 | | 2.95 | | | | 631 | 30.15 | 85.74 | ○ | ○ |
| 74 | 0.3599 | 363 | | 3.22 | | | | 631 | 32.90 | 84.72 | ○ | ◉ |
| 76 | 0.6230 | 344 | | 3.09 | | | | 621 | 16.62 | 77.59 | ○ | ○ |
| 77 | 0.6262 | 341 | | 3.15 | | | | 621 | 16.28 | 79.87 | ○ | ○ |
| 78 | 0.6263 | 349 | | 3.08 | | | | 619 | 15.76 | 70.17 | ○ | ○ |
| 79 | 0.6259 | 345 | | 3.12 | | | | 619 | 15.80 | 80.54 | ○ | ○ |
| 80 | 0.6262 | 344 | | 3.10 | | | | 619 | 15.79 | 80.58 | ○ | ○ |
| 81 | 0.6066 | 342 | | 3.20 | | | | 621 | 16.73 | 78.94 | ○ | ○ |

TABLE 3-6

| Example No. | Thickness × Cu concentration (mol/m²) | Tg | Tm | Specific gravity | λ_{TB50} (nm) on 0.11 mm thickness basis | T1200 (%) on 0.11 mm thickness basis |
|---|---|---|---|---|---|---|
| Comp.Ex.A | 0.1317 | | | 2.72 | | |
| Comp.Ex.B | 0.2640 | 431 | 715 | 2.89 | 627 | 35.88 |
| Comp.Ex.C | 0.3280 | 463 | 790 | 3.12 | 627 | 26.39 |
| Comp.Ex.D | 0.8219 | 392 | 764 | 2.81 | 631 | 15.89 |

TABLE 3-6-continued

| | | | | | |
|---|---|---|---|---|---|
| Comp.Ex.E | 0.8209 | 379 | 736 | 2.88 | 633 | 17.87 |
| Comp.Ex.F | 0.8455 | 381 | 736 | 2.90 | 627 | 16.01 |

| Example No. | T400 (%) on 0.11 mm thickness basis | $\lambda_{T50}$ (nm) on 0.21 cm thickness basis | T1200 (%) on 0.21 mm thickness basis | T400 (%) on 0.21 mm thickness basis | Meltability (1000° C. 60 min.) | Weatherabilty (1 week, 85° C. 85% RH) |
|---|---|---|---|---|---|---|
| Comp.Ex.A | | | | | X | |
| Comp.Ex.B | 69.29 | | | | ○ | |
| Comp.Ex.C | 55.69 | | | | ○ | |
| Comp.Ex.D | 75.72 | | | | ○ | X |
| Comp.Ex.E | 69.84 | | | | ○ | X |
| Comp.Ex.F | 55.10 | | | | ○ | X |

As glass starting materials, there were weighed and mixed, for example, phosphates, fluorides, carbonates, nitrates, oxides and the like so as to yield 150 g to 300 g of glass that contained 0.080 mass % of $Sb_2O_3$ in outer percentage notation, in the composition of Example 64 of Table 1. The resulting mixture was placed in a platinum crucible or quartz crucible, and was melted under melting conditions similar to those of Example 64, with homogenization through stirring and defoaming, followed by pouring into a pre-heated molding mold, to mold the melt to a predetermined shape. The obtained glass molded body was transferred to an annealing furnace heated to about the glass transition temperature, and was cooled slowly down to room temperature. A test piece was cut out from the obtained glass, and both sides were mirror-polished, to a thickness of about 0.2 mm, and then the transmittance characteristic was evaluated in accordance with the above method. The evaluation results revealed a transmittance T1200 of 27.9% at a wavelength of 1200 nm and a transmittance T400 of 87.4% at a wavelength of 400 nm, as values for a thickness of 0.11 mm (converted). From the comparison between the above evaluation results and the evaluation results of Example 64, it can be confirmed that coloring can be suppressed, and visible light transmittance increased, through addition of $Sb_2O_3$.

A summary of the above aspects follows last.

According to one aspect, near-infrared absorbing glass is provided that contains at least, as constituent ions, P ions, Cu ions, O ions, one or more ions selected from the group consisting of Li ions, Na ions and K ions, and one or more ions selected from the group consisting of Mg ions, Ca ions, Sr ions and Ba ions, wherein, in a glass composition expressed in cation %, the content of Cu ions is 15.0 cation % or lower; the content of P ions is 55.0 cation % or lower; a cation ratio of the total content of Al ions and P ions relative to the total content of Mg ions, Ca ions, Sr ions, Ba ions, Zn ions and Cu ions ((Al ions+P ions)/(Mg ions+Ca ions+Sr ions+Ba ions+Zn ions+Cu ions)) is 5.300 or lower; a cation ratio of the total content of Mg ions, Ca ions, Sr ions and Ba ions relative to the total content of Li ions, Na ions and K ions ((Mg ions+Ca ions+Sr ions+Ba ions)/(Li ions+Na ions+K ions)) is 0.100 or higher; the average valence of cations excluding Cu ions and P ions is lower than 1.500; and, in a glass composition expressed in anion %, the content of O ions is 85.0 anion % or higher, and the ratio of the content of O ions relative to the content of P ions (O ions/P ions) is 3.300 or higher.

The above glass can be near-infrared absorbing glass excellent in near-infrared ray cutting ability, exhibiting high visible light transmittance, as well as excellent in weatherability and meltability.

In one embodiment, in the glass composition of the above glass expressed in cation %, the content of P ions may be 30.0 cation % or higher and 50.0 cation % or less.

In one embodiment, in the glass composition of the above glass expressed in cation %, the content of Li ions may be 10.0 cation % or higher.

In one embodiment, in the glass composition of the above glass expressed in cation %, the content of Cu ions may be 2.1 cation % or higher and 15.0 cation % or less.

In one embodiment, the ratio (O ions/P ions) may be 3.400 or higher.

In one embodiment, in the glass composition of the above glass expressed in cation %, the cation ratio of Zn ions relative to the total content of Mg ions, Ca ions, Sr ions, Ba ions and Zn ions (Zn ions/(Mg ions+Ca ions+Sr ions+Ba ions+Zn ions)) may be 0.600 or lower.

In one embodiment, in the glass composition of the above glass expressed in anion %, the content of O ions may be 90.0 anion % or lower.

In one embodiment, a transmittance T1200 of the above glass at a wavelength of 1200 nm, as a transmittance characteristic on a 0.11 mm thickness basis, may be 42.0% or lower.

In one embodiment, a transmittance T400 of the glass at a wavelength of 400 nm, as a transmittance characteristic on a 0.11 mm thickness basis, may be 68.0% or higher.

In one embodiment, a transmittance T1200 of the glass at a wavelength of 1200 nm, as a transmittance characteristic on a 0.21 mm thickness basis, may be 42.0% or lower.

In one embodiment, a transmittance T400 of the glass at a wavelength of 400 nm, as a transmittance characteristic on a 0.21 mm thickness basis, may be 68.0% or higher.

In one aspect, a near-infrared cutoff filter is provided that is comprised of the above near-infrared absorbing glass.

In one embodiment, the thickness of the above near-infrared cutoff filter may be 0.25 mm or smaller.

In one embodiment, in the above near-infrared cutoff filter, the wavelength at which transmittance is 50%, at a wavelength of 600 nm or longer, may lie in the range of 600 nm to 650 nm, as a transmittance characteristic of the near-infrared cutoff filter on a 0.11 mm thickness basis.

In one embodiment, in the above near-infrared cutoff filter, a transmittance T1200 of the near-infrared cutoff filter at a wavelength of 1200 nm, as a transmittance characteristic on a 0.11 mm thickness basis, may be 42.0% or lower.

In one embodiment, in the above near-infrared cutoff filter, a transmittance T400 of the near-infrared cutoff filter at a wavelength of 400 nm, as a transmittance characteristic on a 0.11 mm thickness basis, may be 68.0% or higher.

In one embodiment, in the above near-infrared cutoff filter, the wavelength at which transmittance is 50%, at a wavelength of 600 nm or longer, may lie in the range of 600 nm to 650 nm, as a transmittance characteristic of the near-infrared cutoff filter on a 0.21 mm thickness basis.

In one embodiment, in the above near-infrared cutoff filter, a transmittance T1200 of the near-infrared cutoff filter at a wavelength of 1200 nm, as a transmittance characteristic on a 0.21 mm thickness basis, may be 42.0% or lower.

In one embodiment, in the above near-infrared cutoff filter, a transmittance T400 of the near-infrared cutoff filter at a wavelength of 400 nm, as a transmittance characteristic on a 0.21 mm thickness basis, may be 68.0% or higher.

It should be noted that the embodiments disclosed herein are exemplary in all features, and are not meant to be restrictive in any way. The scope of the present invention, which is defined by the scope of claims and not by the above explanation, is meant to encompass all modifications within a meaning and a scope equivalent to the scope of the claims.

For example, near-infrared absorbing glass according to one aspect of the present invention can be obtained by adjusting the compositions, set forth in the specification, of the glass compositions illustrated above.

Needless to say, two or more features illustrated in the specification, or set forth as preferred ranges, may be combined optionally.

The invention claimed is:

1. Near-infrared absorbing glass, comprising at least, as constituent ions,
   P ions;
   Cu ions;
   O ions;
   optionally, Al ions;
   one or more ions selected from the group consisting of Li ions, Na ions and K ions; and
   one or more ions selected from the group consisting of Mg ions, Ca ions, Sr ions and Ba ions,
   wherein, in a glass composition expressed in cation %,
   a content of Na ions is 0 cation % or higher and 1.0 cation % or lower;
   a content of Cu ions is 5.1 cation % or higher and 15.0 cation % or lower;
   a content of P ions is 55.0 cation % or lower;
   a cation ratio of a total content of Al ions and P ions relative to a total content of Mg ions, Ca ions, Sr ions, Ba ions, Zn ions and Cu ions ((Al ions+P ions)/(Mg ions+Ca ions+Sr ions+Ba ions+Zn ions+Cu ions)) is 5.300 or lower;
   a cation ratio of a total content of Mg ions, Ca ions, Sr ions and Ba ions relative to a total content of Li ions, Na ions and K ions ((Mg ions+Ca ions+Sr ions+Ba ions)/(Li ions+Na ions+K ions)) is 0.100 or higher;
   an average valence of cations excluding Cu ions and P ions is lower than 1.500; and
   in a glass composition expressed in anion %,
   a content of O ions is 85.0 anion % or higher, and
   a ratio of the content of O ions relative to a content of P ions (O ions/P ions) is 3.300 or higher.

2. The near-infrared absorbing glass according to claim 1, wherein, in the glass composition expressed in cation %, the content of P ions is 30.0 cation % or higher and 50.0 cation % or less.

3. The near-infrared absorbing glass according to claim 1, wherein, in the glass composition expressed in cation %, a content of Li ions is 10.0 cation % or higher.

4. The near-infrared absorbing glass according to claim 1, wherein, the ratio (O ions/P ions) is 3.400 or higher.

5. The near-infrared absorbing glass according to claim 1, wherein, in the glass composition expressed in cation %, a cation ratio of Zn ions relative to a total content of Mg ions, Ca ions, Sr ions, Ba ions and Zn ions (Zn ions/(Mg ions+Ca ions +Sr ions+Ba ions+Zn ions)) is 0.600 or lower.

6. The near-infrared absorbing glass according to claim 1, wherein, in the glass composition expressed in anion %, a content of F ions is 10.0 anion % or lower.

7. The near-infrared absorbing glass according to claim 1, wherein, as a transmittance characteristic on a 0.11 mm thickness basis, a wavelength at which transmittance is 50%, at a wavelength of 600 nm or longer, lies in a range of 600 nm to 650 nm, a transmittance T1200 at a wavelength of 1200 nm is 42.0% or lower, and a transmittance T400 at a wavelength of 400 nm is 68.0% or higher.

8. The near-infrared absorbing glass according to claim 1, wherein, as a transmittance characteristic on a 0.21 mm thickness basis, a wavelength at which transmittance is 50%, at a wavelength of 600 nm or longer, lies in a range of 600 nm to 650 nm, a transmittance T1200 at a wavelength of 1200 nm is 42.0% or lower, and a transmittance T400 at a wavelength of 400 nm is 68.0% or higher.

9. A near-infrared cutoff filter, which is comprised of the near-infrared absorbing glass according to claim 1.

10. The near-infrared cutoff filter according to claim 9, which has a thickness of 0.25 mm or smaller.

11. The near-infrared cutoff filter according to claim 9, wherein, as a transmittance characteristic on a 0.11 mm thickness basis, a wavelength at which transmittance is 50%, at a wavelength of 600 nm or longer, lies in a range of 600 nm to 650 nm, a transmittance T1200 at a wavelength of 1200 nm is 42.0% or lower, and a transmittance T400 at a wavelength of 400 nm is 68.0% or higher.

12. The near-infrared cutoff filter according to claim 9, wherein, as a transmittance characteristic on a 0.21 mm thickness basis, a wavelength at which transmittance is 50%, at a wavelength of 600 nm or longer, lies in a range of 600 nm to 650 nm, a transmittance T1200 at a wavelength of 1200 nm is 42.0% or lower, and a transmittance T400 at a wavelength of 400 nm is 68.0% or higher.

13. The near-infrared absorbing glass of claim 1, wherein the cation ratio of a total content of Mg ions, Ca ions, Sr ions and Ba ions relative to the total content of Li ions, Na ions and K ions ((Mg ions+Ca ions+Sr ions+Ba ions)/(Li ions+Na ions+K ions)) is 0.100 or higher and 0.560 or lower.

* * * * *